US011200425B2

(12) United States Patent
Gupta et al.

(10) Patent No.: US 11,200,425 B2
(45) Date of Patent: Dec. 14, 2021

(54) METHOD FOR PROVIDING KEY MOMENTS IN MULTIMEDIA CONTENT AND ELECTRONIC DEVICE THEREOF

(71) Applicant: Samsung Electronics Co., Ltd., Suwon-si (KR)

(72) Inventors: Yash Gupta, Noida (IN); Abhishek Gogia, Noida (IN); Ankit Babbar, Noida (IN); Dhananjay Kaushal, Noida (IN); Gurpreet Singh, Noida (IN); Kanika Gupta, Noida (IN); Sonam Chawla Bhatia, Noida (IN); Swati Kaushik, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 16/571,608

(22) Filed: Sep. 16, 2019

(65) Prior Publication Data

US 2020/0097731 A1    Mar. 26, 2020

(30) Foreign Application Priority Data

Sep. 21, 2018  (IN) .............................. 201841035651

(51) Int. Cl.
*G06K 9/00* (2006.01)
*G06F 16/432* (2019.01)
(Continued)

(52) U.S. Cl.
CPC ....... *G06K 9/00744* (2013.01); *G06F 16/433* (2019.01); *G06F 16/437* (2019.01); *G06K 9/00718* (2013.01); *H04N 21/8456* (2013.01)

(58) Field of Classification Search
CPC ............ G06K 9/00744; G06K 9/00718; G06F 16/437; G06F 16/433; H04N 21/8456
See application file for complete search history.

(56) References Cited

U.S. PATENT DOCUMENTS 7,359,440 B2    4/2008  Zhang et al.
7,889,794 B2    2/2011  Luo et al.
(Continued)

FOREIGN PATENT DOCUMENTS

JP    2006308729 A    11/2006
JP    4760841 B2    8/2011
(Continued)

OTHER PUBLICATIONS

International Search Report dated Jan. 6, 2020, issued in an International application No. PCT/KR2019/011899.
(Continued)

*Primary Examiner* — Sunghyoun Park
(74) *Attorney, Agent, or Firm* — Jefferson IP Law, LLP

(57) ABSTRACT

A method for automatically providing key moments in a multimedia content on an electronic device and an electronic device therefor are provided. The method includes determining a navigation behavior of each user of the multimedia content during playback, determining a plurality of key moments in the multimedia content based on the navigational behavior, the plurality of key moments including a positive key moment, a negative key moment, and a neutral key moment, storing the plurality of key moments, detecting a playback event of the multimedia content by a candidate user, retrieving at least one key moment from the plurality of key moments in the multimedia content based on the candidate user, and displaying an actionable user interface including the at least one key moment.

20 Claims, 27 Drawing Sheets

(51) Int. Cl.
*G06F 16/435* (2019.01)
*H04N 21/845* (2011.01)

(56) References Cited

U.S. PATENT DOCUMENTS

| | | | |
|---|---|---|---|
| 7,921,116 B2 | 4/2011 | Finkelstein et al. | |
| 8,051,078 B2 | 11/2011 | Lau et al. | |
| 8,238,672 B2 | 8/2012 | Choi et al. | |
| 8,938,151 B2 | 1/2015 | Bamba et al. | |
| 9,106,958 B2 | 8/2015 | El Kaliouby et al. | |
| 9,465,435 B1 | 10/2016 | Zhang et al. | |
| 2002/0126203 A1 | 9/2002 | Yu et al. | |
| 2003/0093790 A1 | 5/2003 | Logan et al. | |
| 2003/0210886 A1 | 11/2003 | Li et al. | |
| 2005/0228849 A1 | 10/2005 | Zhang | |
| 2007/0248334 A1 | 10/2007 | Murakoshi | |
| 2009/0317060 A1 | 12/2009 | Han et al. | |
| 2010/0094878 A1* | 4/2010 | Soroca | G06Q 30/02 707/748 |
| 2012/0159329 A1 | 6/2012 | Chow et al. | |
| 2013/0006881 A1 | 1/2013 | Klemm | |
| 2013/0205314 A1 | 8/2013 | Ramaswamy et al. | |
| 2014/0255004 A1 | 9/2014 | Allen et al. | |
| 2015/0350369 A1* | 12/2015 | Ilsar | H04L 65/80 709/219 |
| 2016/0019298 A1* | 1/2016 | Brodie | G06F 16/148 707/734 |
| 2016/0057481 A1 | 2/2016 | O'Connor et al. | |
| 2016/0300135 A1 | 10/2016 | Moudy et al. | |
| 2016/0353139 A1* | 12/2016 | Smith | H04N 21/47208 |
| 2017/0257658 A1 | 9/2017 | Ma | |
| 2017/0332120 A1 | 11/2017 | Maynard et al. | |
| 2018/0146253 A1* | 5/2018 | Louboutin | G06Q 30/0201 |

FOREIGN PATENT DOCUMENTS

| | | |
|---|---|---|
| JP | 5574952 B2 | 8/2014 |
| JP | 5944591 B1 | 7/2016 |
| KR | 10-2017-0049116 A | 5/2017 |
| KR | 10-2017-0140683 A | 12/2017 |

OTHER PUBLICATIONS

Indian Office Action dated Aug. 11, 2020 in Indian Application No. 201841035651.

Whitson Gordon; Skip Past the Boring Intro on YouTube Videos with the Wadsworth Constant Bookmarklet; Oct. 13, 2011; https://lifehacker.com/skip-past-the-boring-intro-on-youtube-videos-with-the-w-30799077.

Neil Hunt; Has Netflix thought of adding functiona . . . ip opening and ending credits_—Quora; Nov. 10, 2010; https://www.quora.com/Has-Netflix-thought-of-adding-functionality-to-strip-or-skip-opening-and-ending-credits.

YouTube channels with intros in every video_Why_ _ youtube; https://www.reddit.com/r/youtube/comments/4oj00o/youtube_channels_with_intros_in_every_video_why/.

Extended European Search Report dated Aug. 23, 2021, issued in European Patent Application No. 19861357.2.

* cited by examiner

METHOD FOR PROVIDING KEY MOMENTS IN MULTIMEDIA CONTENT AND ELECTRONIC DEVICE THEREOF

CROSS-REFERENCE TO RELATED APPLICATION(S)

This application is based on and claims priority under 35 U.S.C. § 119 of an Indian patent application number 201841035651, filed on Sep. 21, 2018, in the Indian Intellectual Property Office, the disclosure of which is incorporated by reference herein in its entirety.

BACKGROUND

1. Field

The disclosure relates to multimedia content management. More particularly, the disclosure relates to a method for automatically providing key moments in multimedia content and an electronic device thereof.

2. Description of Related Art

In general, with the advancement in technology, electronic devices are capable to providing a variety of multimedia content such as video, audio, and the like. A multimedia content includes various portions like an introduction, multimedia credits, ending and some portions of interest to a user, as shown in FIG. 1A. The user may only want to watch specific portions of the multimedia content and may not be interested to watch the introduction and the multimedia credits. However, if the user wants to skip watching the introduction and the multimedia credits of the multimedia content, then the user will have to know the exact start and end points of the introduction or the multimedia credits.

While playing the multimedia content (e.g., shown at 102, 104, 106 and 108) on the electronic device, the user may have to perform a plurality of interactions (as shown in 106 and 108 in FIG. 1B) on the multimedia content if the user wants to re-watch a specific portion of the multimedia content. The process of determining the specific portion of interest of the user might be very cumbersome. Further, when an undesired portion of the multimedia content appears, the user will have to manually skip the portion. However, in case the user does not know the exact timing when the undesired portion ends, then the user will have to perform multiple navigations to get to the exact end position of the undesired portion. The multiple navigations may result in the user missing some desired portion which the user did not want to skip.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for automatically providing key moments in multimedia content.

Another aspect of the disclosure is to determine mutual key moments when multiple users are watching the same multimedia content together.

Another aspect of the disclosure is to provide an auto mode to automatically skip through the negative key moment or focus on the positive key moment within the multimedia content without any user interaction.

Another aspect of the disclosure is to determine a plurality of key moments including a positive key moment, a negative key moment, and a neutral key moment in the multimedia content based on the navigational behavior of the user.

Another aspect of the disclosure is to cause to display an actionable user interface which includes the at least one key moment.

Another aspect of the disclosure is to determine a navigation score for each of the timestamp from a plurality of timestamps of the multimedia content.

Another aspect of the disclosure is to automatically perform at least one action corresponding to at least one of the key moments.

Additional aspects will be set forth in part in the description which follows and, in part, will be apparent from the description, or may be learned by practice of the presented embodiments.

In accordance with an aspect of the disclosure, a method for automatically providing key moments in a multimedia content on an electronic device is provided. The method includes determining a navigation behavior of each user of the multimedia content during playback and determining a plurality of key moments in the multimedia content based on the navigational behavior, the plurality of key moments including a positive key moment, a negative key moment, and a neutral key moment, storing the plurality of key moments, detecting a playback event of the multimedia content by a candidate user, retrieving at least one key moment from the plurality of key moments in the multimedia content based on the candidate user, and displaying an actionable user interface including the at least one key moment.

In accordance with another aspect of the disclosure, an electronic device for automatically providing key moments in a multimedia content is provided. The electronic device includes a memory, at least one processor coupled to the memory, and a key moments management engine and the at least one processor. The at least one processor is configured to determine a navigation behavior of each user of the multimedia content during playback, determine a plurality of key moments in the multimedia content based on the navigational behavior, the plurality of key moments including a positive key moment, a negative key moment, and a neutral key moment, store the plurality of key moments, detect a playback event of the multimedia content by a candidate user and retrieve at least one key moment from the plurality of key moments in the multimedia content based on the candidate user, and display, on a display, an actionable user interface comprising the at least one key moment.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
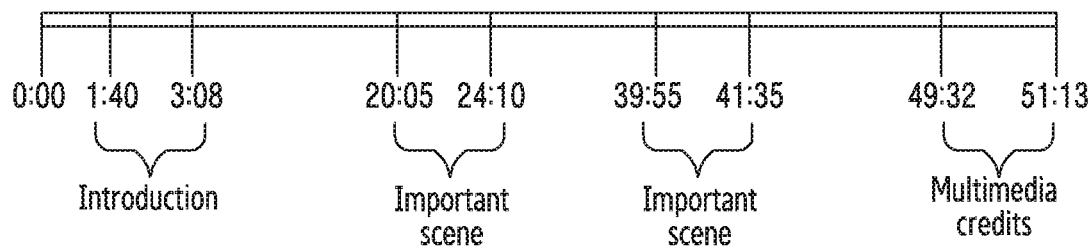
FIG. 1A is an example illustrating a timeline of a multimedia content, according to related art.
Figure 1B:
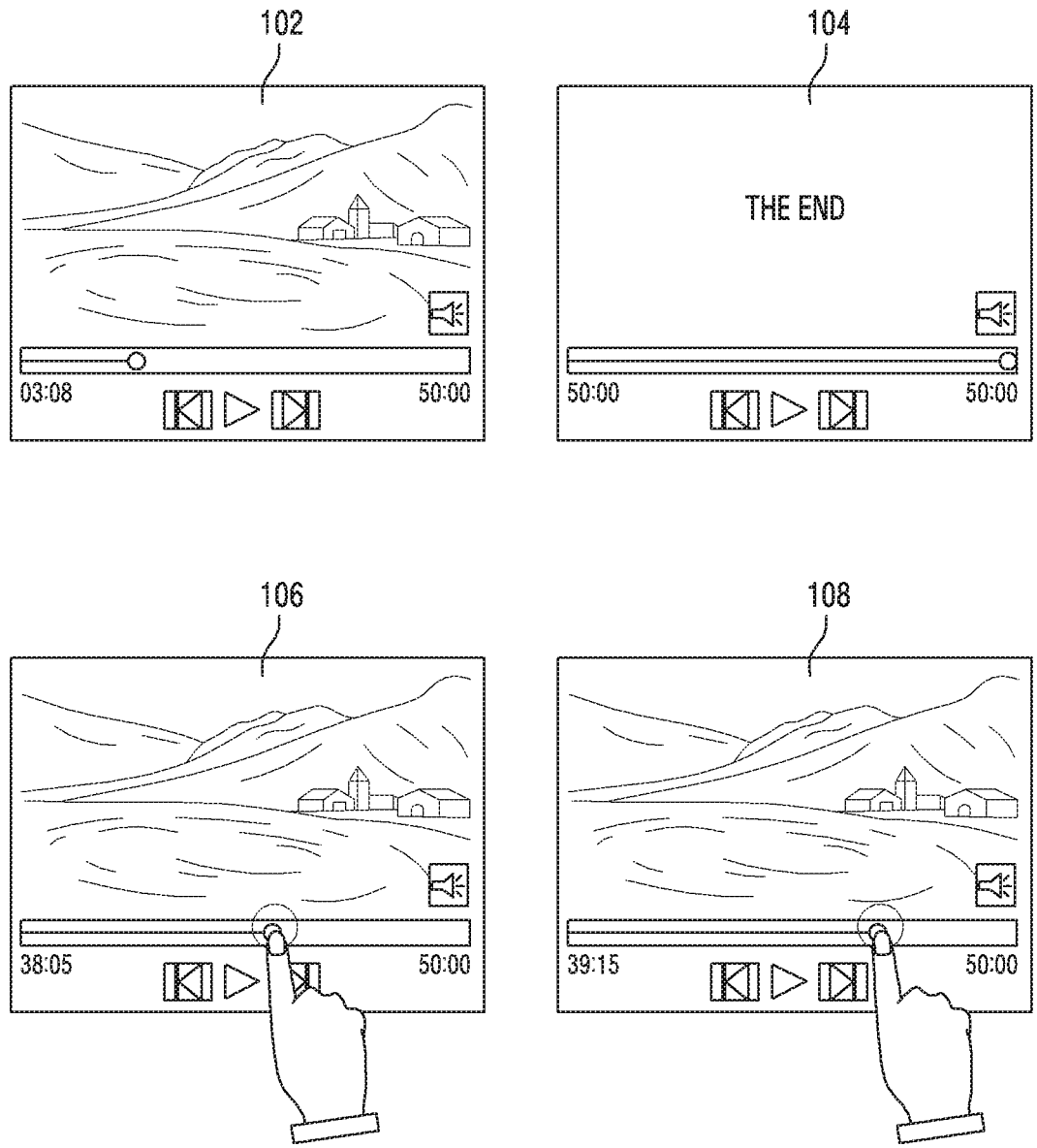
FIG. 1B is an example illustrating navigation behavior of a user of the multimedia content during playback, according to related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for automatically providing key moments in a multimedia content on an electronic device. The method includes determining a navigation behavior of each user of the multimedia content during playback and determining a plurality of key moments in the multimedia content based on the navigational behavior, wherein the plurality of key moments comprises a positive key moment, a negative key moment, and a neutral key moment. The method also includes storing the plurality of key moments. Further, the method includes detecting a playback event of the multimedia content by a candidate user and retrieving at least one key moment from the plurality of key moments in the multimedia content based on the candidate user. Furthermore, the method includes causing to display an actionable user interface comprising the at least one key moment.

In an embodiment, determining the plurality of key moments in the multimedia content based on the navigational behavior includes determining a navigation score for each of the timestamp from a plurality of timestamps of the multimedia content and for each of the timestamp of the multimedia content, determining whether the navigation score is above a navigation threshold, below a navigation threshold or equal to the navigation threshold. Further, the method includes determining the key moment of the plurality of key moments as the positive key moment when the navigation score of at least one timestamp from the plurality of timestamps is above the navigation threshold, the negative key moment when the navigation score of at least one timestamp from the plurality of timestamps is below the navigation threshold, and the neutral key moment when the navigation score of the at least one timestamp from the plurality of timestamps is equal to the navigation threshold.

In an embodiment, determining the navigation score for each of the timestamp from the plurality of timestamps of the multimedia content includes detecting an event associated with the multimedia content based on a number of times at least one portion of the multimedia content is played back. Further, the method includes assigning a weight to each of the timestamps of the multimedia content based on the event and determining the navigation score for each of the timestamp based on the assigned weight.

In an embodiment, a start point and an end point of the positive key moment is identified when the navigation score of the at least one time stamp is above the navigation threshold, wherein a start point and an end point of the negative key moment is identified when the navigation score of the at least one time stamp is below the navigation threshold, and wherein a start point and an end point of the neutral key moment is identified when the navigation score of the at least one time stamp is equal to the navigation threshold.

In an embodiment, determining the navigation behavior of each user of the multimedia content includes creating a user profile of each of the user based on a plurality of parameters associated with the user and detecting interactions of each of the users on at least one timestamp of the multimedia content during playback. Further, the method includes determining a navigation behavior of each of the users of the multimedia content based on the interactions of each of the users on at least one timestamp.

In an embodiment, the method further includes automatically performing, by the electronic device, at least one action corresponding to at least one of the key moments.

In an embodiment, retrieving the at least one key moment from the plurality of key moments in the multimedia content based on the candidate user includes determining at least one user profile matching for the candidate user and retrieving the at least one key moment from the plurality of key moments in the multimedia content based on the navigational behavior of the at least one matching user profile.

In an embodiment, the actionable user interface comprising the at least one key moment is displayed on at least one of a timeline of the multimedia content, at least one portion of a screen of the electronic device, and at least one portion of the multimedia content.

In an embodiment, the positive key moment, the negative key moment or the neutral key moment is differenced in the actionable user interface by using a unique identifier.

In an embodiment, the at least one action comprises fast forwarding the at least one key moment in the multimedia content, focusing on the at least one key moment in the multimedia content, controlling a playback speed of the at least one key moment in the multimedia content, extracting an audio from the at least one key moment, sharing only the at least one key moment from the multimedia content, previewing only the at least one key moment from the multimedia content and downloading only the at least one key moment from the multimedia content.

In the methods and systems of the related art, the user is required to manually navigate to determine the portions of the multimedia content to be played/avoided. Unlike to the methods and system of the related art, the proposed method automatically displays the key moments in the multimedia content based on the candidate user's navigation behavior, the navigation behavior of multiple user with respect to the same/similar genre multimedia content.

Unlike to the methods and system of the related art, the proposed method includes categorizing the key moments of the multimedia content as positive (e.g., interesting) and negative (e.g., uninteresting) for the candidate user.

Unlike to the methods and system of the related art, in proposed method the electronic device allows the user to perform various actions on the key moments such as fast forwarding the negative key moment, navigate to start of positive key moment, play/pause/mute key moment, extract audio, social share, etc.

In the methods and systems of the related art, when the user tries to skip through a segment of the multimedia content they might accidentally skip less/more or navigate back and forth multiple times within a short duration, or skip less and watch the portion which is undesired. Unlike to the methods and systems of the related art, in the proposed method a time difference between multiple hops during navigation is tracked for multiple users playing the same multimedia content and the negative/positive key moments are recommended to the user.

Referring now to the drawings, and more particularly to FIGS. 2A through 15B, where similar reference characters denote corresponding features consistently throughout the figures, there are shown preferred embodiments.

Figure 2A:
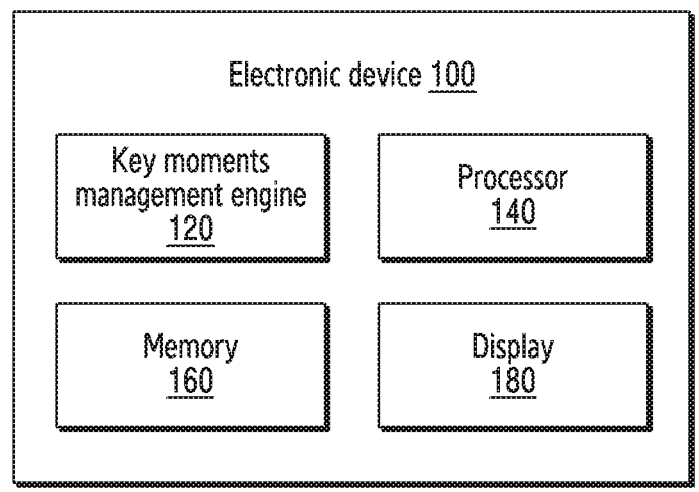
FIG. 2A is a block diagram of an electronic device for automatically providing key moments in a multimedia content, according to an embodiment of the disclosure.

FIG. 2A is a block diagram of the electronic device 100 for automatically providing the key moments in the multimedia content, according to an embodiment of the disclosure.

Referring to FIG. 2A, the electronic device 100 can be, for example, a laptop, a personal computer, a mobile phone, a smart phone, personal digital assistant (PDA), a tablet, a wearable device, or the like. In an embodiment, the electronic device 100 can include a key moments management engine 120, a processor 140, a memory 160 and a display 180.

In an embodiment, the key moments management engine 120 is configured to determine the navigation behavior of each user of the multimedia content when the multimedia content is played. Further, the key moments management engine 120 is also configured to determine the plurality of key moments in the multimedia content based on the navigational behavior of the user when the multimedia content is played. The plurality of key moments may be one of the positive key moment, the negative key moment, and the neutral key moment. To determine the plurality of key moments in the multimedia content, the key moments management engine 120 detects the event associated with the multimedia content based on a number of times the at least one portion of the multimedia content is played back. Further, the key moments management engine 120 assigns a weight to each of the timestamps of the multimedia content based on the event and determines the navigation score for each of the timestamp based on the assigned weight.

The positive key moment is a portion of the multimedia content which is desirable to the user, i.e., the portion of the multimedia content which the user has replayed and watched more than once. The negative key moment is the portion of the multimedia content which is undesirable to the user, i.e., the portion of the multimedia content which the user has skipped watching while playing the multimedia content. The neutral moment is the portion of the multimedia content which is neither desirable nor undesirable to the user. A start point and an end point of the positive key moment is identified when the navigation score of the at least one time stamp is above the navigation threshold. The start point and the end point of the negative key moment is identified when the navigation score of the at least one time stamp is below the navigation threshold. The start point and the end point of the neutral key moment is identified when the navigation score of the at least one time stamp is equal to the navigation threshold.

Further, the key moments management engine 120 is also configured to store the plurality of key moments in a data store 124. Further, when the key moments management engine 120 detects the playback event of the multimedia content by the candidate user, the key moments management engine 120 retrieves the at least one key moment from the plurality of key moments in the multimedia content based on the candidate user. The key moments management engine 120 causes to display the actionable user interface which includes a preview of the at least one key moment. The actionable user interface is displayed on the at least one of the timeline of the multimedia content, at least one portion of a screen of the electronic device 100, and at least one portion of the multimedia content. The at least one key moment may be stacked up together and displayed as a set on the actionable user interface or may be provided individually. The preview of the at least one key moment may be displayed in the form of at least one of the thumbnail, the graphics interchange format (GIF), the short clip along with the unique identifier which is used to differentiate the positive key moment, the negative key moment and the neutral key moment. The shape of the unique identifier will indicate that the key moment as 'previous' or 'next' based on direction of the arrow in the unique identifier. The preview of the key moment includes information which indicates the time duration after/before which the key moment will/has appear in the multimedia content being played on the electronic device 100. Further, the preview of the key moment also includes related tags (e.g., introduction, horror scene, video credits, etc.) which are deduced by the electronic device 100 based on the navigation behavior of multiple users whose user profiles match that of the candidate user, other popular tags in user comments section, tags added by publisher etc. The preview of the negative key moment also indicates the duration of the key moment.

Furthermore, the key moments management engine 120 is also configured to perform at least one action corresponding to the at least one key moment. The at least one action may be one of fast forwarding the at least one key moment in the multimedia content, focusing on the at least one key moment in the multimedia content, controlling a playback speed of the at least one key moment in the multimedia content, extracting an audio from the at least one key moment, sharing only the at least one key moment from the multimedia content, previewing only the at least one key moment from the multimedia content and downloading only the at least one key moment from the multimedia content.

In an embodiment, the processor 140 is configured to interact with the hardware elements such as the key moments management engine 120, the memory 160 and the display 180 for automatically providing the key moments in the multimedia content.

In an embodiment, the memory 160 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In some examples, the memory 160 is configured to store larger amounts of information than the memory. In certain examples, a non-transitory storage medium may store data that can, over time, change (e.g., in Random Access Memory (RAM) or cache).

In an embodiment, the display 180 can be a portion of a screen of the electronic device 100 which is used to display/play the multimedia content to the user. The display 180 is configured to display the preview of the at least one key moment in the form of at least one of the thumbnail, the GIF, the short clip along with the unique identifier which is used to differentiate the positive key moment, the negative key moment and the neutral key moment.

Although the FIG. 2A shows the hardware elements of the electronic device 100 but it is to be understood that other embodiments are not limited thereon. In other embodiments, the electronic device 100 may include more or less number of elements. Further, the labels or names of the elements are used only for illustrative purpose and does not limit the scope of the disclosure. One or more components can be combined together to perform same or substantially similar function for automatically providing the key moments in the multimedia content.

Figure 2B:
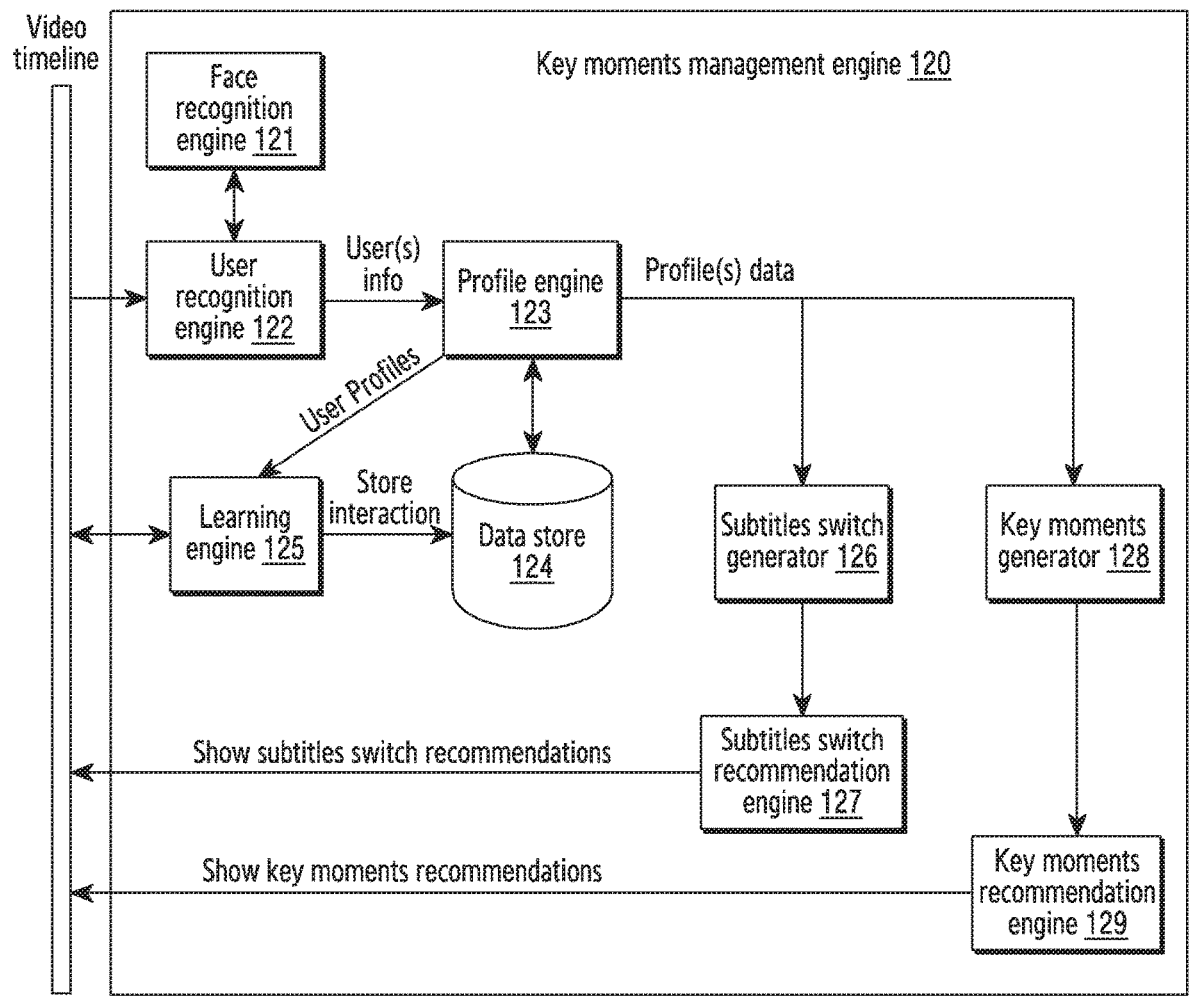
FIG. 2B is a block diagram of a key moments management engine, according to an embodiment of the disclosure.

FIG. 2B is a block diagram of the key moments management engine 120, according to an embodiment of the disclosure.

Referring to FIG. 2B, the key moments management engine 120 can include a face recognition engine 121, a user recognition engine 122, a profile engine 123, a data store 124, a learning engine 125, a subtitles switch generator 126, a subtitles switch recommendation engine 127, a key moments generator 128 and a key moments recommendation engine 129.

In an embodiment, the face recognition engine 121 is configured to capture user face data and recognizing the user by using a camera of the electronic device 100. Further, the face recognition engine 121 is also configured to match the saved user face data along with identifying age group/gender of the users based on the user face data. Further, the face recognition engine 121 is also configured to feed the user face data as part of user information to the profile engine 123 for creating user profiles.

In an embodiment, the user recognition engine 122 is configured to identify the candidate user who is playing/interacting with the multimedia content on the electronic device 100. The candidate user is identified by tracking the user logged-in session cookies in any browser related content within an application in the electronic device 100 etc.

In an embodiment, the profile engine 123 is configured to create the user profiles based on the user information identified by the user recognition engine 122 based on age, gender, location, past history, interests, language preferences, IP address information etc. Further, the profile engine 123 is configured to determine and add subtitle switch data to the user profiles. Further, the profile engine 123 is configured to perform the following:

Profile fetching: The profile engine 123 fetches matching profile based on the user information provided from the data store 124. All relevant data of such users of profile.

Profile generation: The profile engine 123 creates a new user profile when no matching profile data is found.

Multi-user profile extraction: The profile engine 123 determines when multiple users are interacting with the multimedia content and extracts all the matching profiles based on the user information available at the data store 124, the face recognition engine 121 and the user recognition engine 122. Further, the profile engine 123 determines an intersection of the user profiles to find common area of interest among the multiple users interacting with the multimedia content.

Profile data extraction: The profile engine 123 is configured to extract relevant session data and the data tracked for the users for whom the profiles are created from the data store 124.

Profile score generation: The profile engine 123 is configured to generate a unique score for each user profile based on the interests of the candidate user such as social interaction, browsing history, multimedia contents downloaded etc. Further, the score is used to give weight age to session of the user and also to handle false/duplicate user data.

In an embodiment, the data store 124 is configured to store user information and also the user profile created by the profile engine 123.

In an embodiment, the learning engine 125 is configured to learn the navigation behavior of the user on the multimedia content belonging to a particular genre. Further, the learning engine 125 is also configured to consider the user's profile information and previously learned navigation behavior of other users with matching profile while accessing the same/similar multimedia content(s). Furthermore, the learning engine 125 is also configured to determine the interactions of the user with a previously inferred key moment. Further, the learning engine 125 is configured to recalculate the navigation score for the key moment. Further, if the recalculated navigation score for the key moment and determine whether the recalculated navigation score is above/below the navigation threshold, then the learning engine 125 is configured to redefine the current key moment as a positive/negative key moment. Therefore, by continuously learning user's navigation behavior along with the pre-determined data, the learning engine 125 gradually infers an accurate key moment.

The learning is done based on:

Watching/Listening behavior of the user, i.e., the portions of the multimedia content watched/listened, play/pause points in the multimedia content and duration of watching/pausing on the multimedia content.

The navigation behavior of the user on the multimedia content: the learning engine 125 is configured to monitor the interactions of the user on a seek bar/timeline or forward/backward control buttons on the multimedia content. The navigation behavior of the user also includes the speed variation preferences of the user on the multimedia content, subtitle switching performed by the user, etc.

In an embodiment, the subtitles switch generator 126 is configured to fetch from the profile engine 123, the matching user profiles along with the subtitle switch data for the candidate user recognized by the user recognition engine 122. Further, the subtitles switch generator 126 is configured to extract subtitle switch points based on the user information extracted from the profile engine 123.

In an embodiment, the subtitles switch recommendation engine 127 is configured to interact with the subtitles switch generator 126 and recommend turning on/off or switching subtitles within the multimedia content which is played on the electronic device 100.

In an embodiment, the key moments generator 128 is configured to extract the all user profiles which are matching with the candidate user, the user information and the session data associated with the matching profiles from the profile engine 123. Further, based on the extracted information the key moments generator 128 is configured to generate the key moments by traversing through all the available session data.

The key moments are generated as follows:

Consider each unit frame of the multimedia content and determine a weighted scores of unit frames as follows:

Determine a unit frame score as per user interaction on the multimedia content in each session.

Determine an average session score for each user.

Determine a weighted score of unit frames using the average session score for each user and a user profile score.

Provide graphical seek bar for the multimedia content using the generated weighted scores of unit frames and identify/classify the key moments as positive key moments and negative key moments (as shown in FIG. 4A).

Score of each unit frame: Suf=(Σ(Σ(score of session)/total sessions)*profile score)/total users.

The unit frame (uf) is the smallest traceable duration of the multimedia content (~1 sec). The deviation points include an inward deviation point which is a point on the timeline to where the user is navigating from some other point. The outward deviation point is a point on the timeline from where the user is navigating to some other point. The focus point is a point on the timeline of the multimedia content where there is a significant deviation. The interest index is a factor depicting how much interesting the whole video is based on the user navigation behavior on the seek bar of the multimedia content.

The user activity in any unit frame is as provided in Table. 1.

TABLE 1

| Event (E) | Weight | Functions |
| --- | --- | --- |
| Watched | C1 + wF | C1: constant, wF: watchFactor, which depends on whether the unit frame is always watched |
| Not watched | C2 − nwF | C2: constant, nwF: not watched Factor which depends on whether the unit frame is always not watched |
| Skipped | C3 − sF | C3: constant, sF: skipFactor, which depends on whether the unit frame is skipped (same/multiple sessions) |
| Watched again | C4 + rwF | C4: constant, rwF: re-watchFactor, which depends on whether the unit frame is re-watched (same/multiple sessions) |
| Paused | C5 + pF | C5: constant, pF: pauseFactor, which depends on the duration the unit frame is paused |

In an embodiment, the key moments recommendation engine 129 determines that the multimedia content is being played by the electronic device 100 and is configured to interact with the key moments generator 128 to identify the key moments for the current instant of time of the multimedia content being played. Further, the recommendations of the key moments are displayed at the specific instant of time of the multimedia content or specific number of times (factor f) only. The key moments are recommended as the positive key moments and the negative key moments which are determined based on the user profile and navigation behavior of the user on the multimedia content.

Figure 2C:
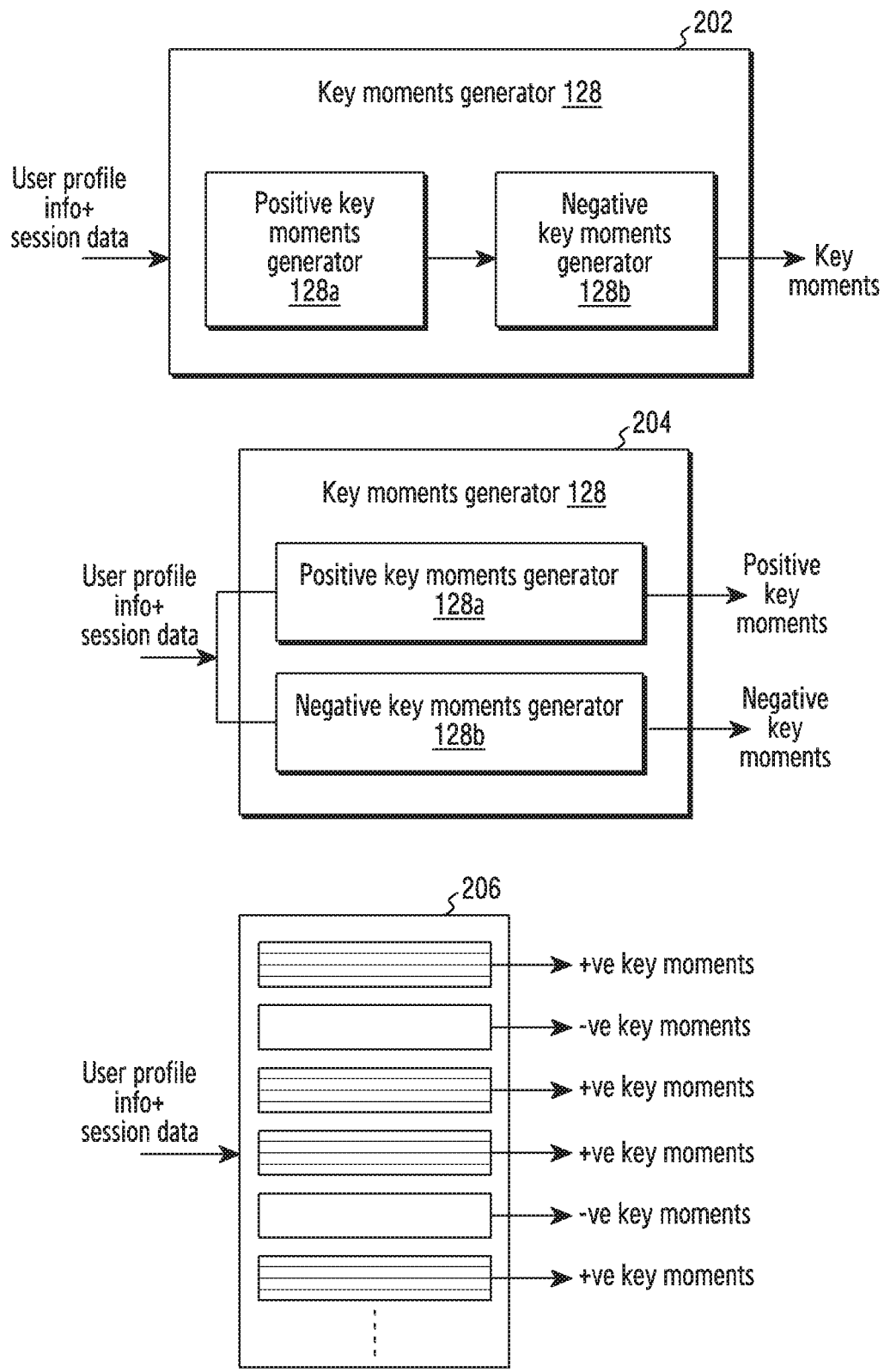
FIG. 2C illustrates examples of a key moments generation in several ways, according to an embodiment of the disclosure.

FIG. 2C illustrates examples of the key moments generation in several ways, according to an embodiment of the disclosure.

Referring to FIG. 2C, the key moments generator 128 includes a positive key moments generator 128a and a negative key moments generator 128b. The key moments generator 128 can be configured to generate the key moments in several ways. The key moments generation process using profile and session data is further divided into two main parts, i.e., the positive key moments generation and the negative key moments generation which can be executed in several ways.

In an embodiment, as shown at 202, the positive key moments and the negative key moments can be generated serially, i.e., the positive key moments generator 128a determines the positive key moments followed by the negative key moments generator 128b generating the negative key moments.

In another embodiment, as shown at 204, the positive key moments and the negative key moments can be generated parallelly, i.e., the positive key moments generator 128a determines the positive key moments simultaneously as the negative key moments generator 128b generating the negative key moments.

In another embodiment, as shown at 206, the key moments can be processed in several chunks or the timeline of the multimedia content can be divided into chunks. Further, separate processing can be done on the chunks of data for key moment generation parallelly.

Figure 3A:
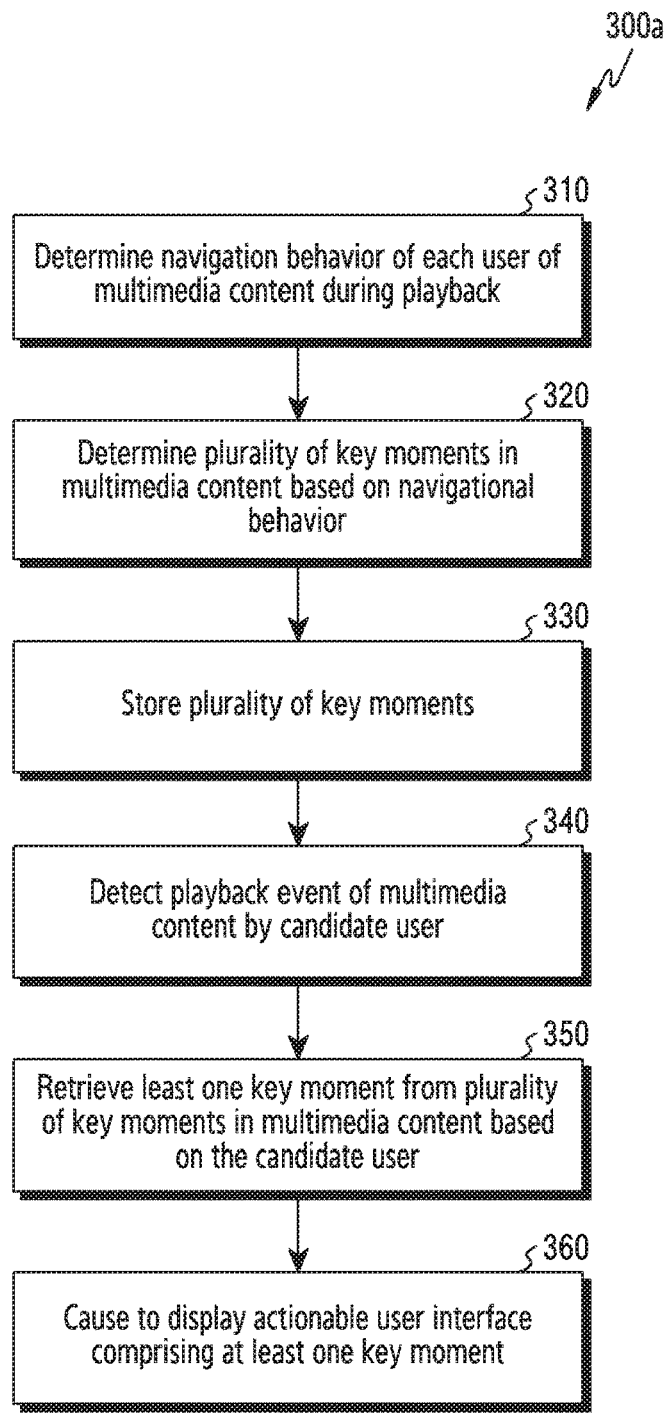
FIG. 3A is a flow chart illustrating a method for automatically providing key moments in the multimedia content on the electronic device, according to an embodiment of the disclosure.

FIG. 3A is a flow chart 300a illustrating a method for automatically providing the key moments in the multimedia content on the electronic device 100, according to an embodiment of the disclosure.

Referring to FIG. 3A, at operation 310, the electronic device 100 determines the navigation behaviour of each of the users of the multimedia content during playback. For example, in the electronic device 100 as illustrated in the FIG. 2A, the key moments management engine 120 can be configured to determine the navigation behaviour of each of the users of the multimedia content during playback.

At operation 320, the electronic device 100 determines the plurality of key moments in the multimedia content based on the navigational behaviour. The plurality of key moments includes the positive key moment, the negative key moment and the neutral key moment. For example, in the electronic device 100 as illustrated in the FIG. 2A, the key moments management engine 120 can be configured to determine the plurality of key moments in the multimedia content based on the navigational behaviour, where the plurality of key moments includes the positive key moment, the negative key moment and the neutral key moment.

At operation 330, the electronic device 100 stores the plurality of key moments. For example, in the electronic device 100 as illustrated in the FIG. 2A, the key moments management engine 120 can be configured to store the plurality of key moments.

At operation 340, the electronic device 100 detects the playback event of the multimedia content by the candidate user. For example, in the electronic device 100 as illustrated in the FIG. 2A, the key moments management engine 120 can be configured to detect the playback event of the multimedia content by the candidate user.

At operation 350, the electronic device 100 retrieves the least one key moment from the plurality of key moments in the multimedia content based on the candidate user. For example, in the electronic device 100 as illustrated in the FIG. 2A, the key moments management engine 120 can be configured to retrieve the least one key moment from the plurality of key moments in the multimedia content based on the candidate user.

At operation 360, the electronic device 100 causes to display the actionable user interface comprising the at least one key moment. For example, in the electronic device 100 as illustrated in the FIG. 2A, the key moments management engine 120 can be configured to cause to display the actionable user interface comprising the at least one key moment.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3B:
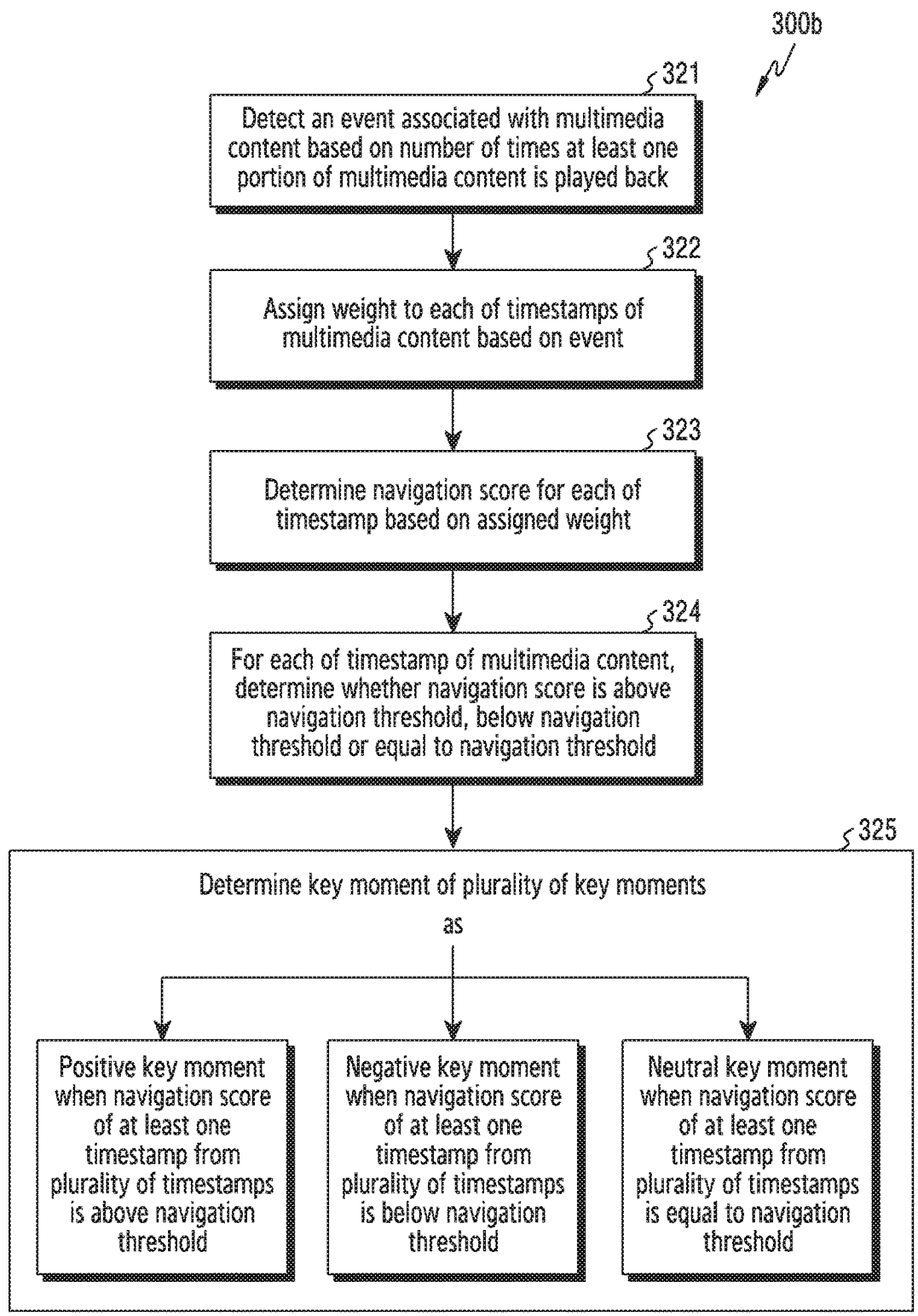
FIG. 3B is a flow chart illustrating a method for determining a plurality of key moments in the multimedia content based on the navigational behavior of the user, according to an embodiment of the disclosure.

FIG. 3B is a flow chart 300b illustrating the method for determining the plurality of key moments in the multimedia content based on the navigational behavior of the user, according to an embodiment of the disclosure.

Referring to FIG. 3B, at operation 321, the electronic device 100 detects the event associated with the multimedia content based on the number of times at least one portion of multimedia content is played back. For example, in the electronic device 100 as illustrated in the FIG. 2B, the learning engine 125 (i.e., a key learning engine) can be configured to detect the event associated with the multimedia content based on the number of times at least one portion of multimedia content is played back.

At operation 322, the electronic device 100 assigns the weight to each of the timestamps of the multimedia content based on the event. For example, in the electronic device 100 as illustrated in the FIG. 2B, the key moments generator 128 can be configured to assign the weight to each of the timestamps of the multimedia content based on the event.

At operation 323, the electronic device 100 determines the navigation score for each of the timestamp based on the assigned weight. For example, in the electronic device 100 as illustrated in the FIG. 2B, the key moments generator 128 can be configured to determine the navigation score for each of the timestamp based on the assigned weight.

At operation 324, the electronic device 100 determines whether the navigation score is above the navigation threshold, below the navigation threshold or equal to the navigation threshold for each of the timestamp of the multimedia content. For example, in the electronic device 100 as illustrated in the FIG. 2B, the key moments generator 128 can be configured to determine whether the navigation score is above the navigation threshold, below the navigation threshold or equal to the navigation threshold for each of the timestamp of the multimedia content.

At operation 325, the electronic device 100 determines the key moment of the plurality of key moments as one of the positive key moment when the navigation score of the at least one timestamp from the plurality of timestamps is above the navigation threshold; the negative key moment when the navigation score of the at least one timestamp from the plurality of timestamps is below the navigation threshold; and the neutral key moment when the navigation score of the at least one timestamp from the plurality of timestamps is equal to the navigation threshold. For example, in the electronic device 100 as illustrated in the FIG. 2B, the key moments generator 128 can be configured to determine the key moment of the plurality of key moments as one of the positive key moment when the navigation score of the at least one timestamp from the plurality of timestamps is above the navigation threshold; the negative key moment when the navigation score of the at least one timestamp from the plurality of timestamps is below the navigation threshold; and the neutral key moment when the navigation score of the at least one timestamp from the plurality of timestamps is equal to the navigation threshold.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
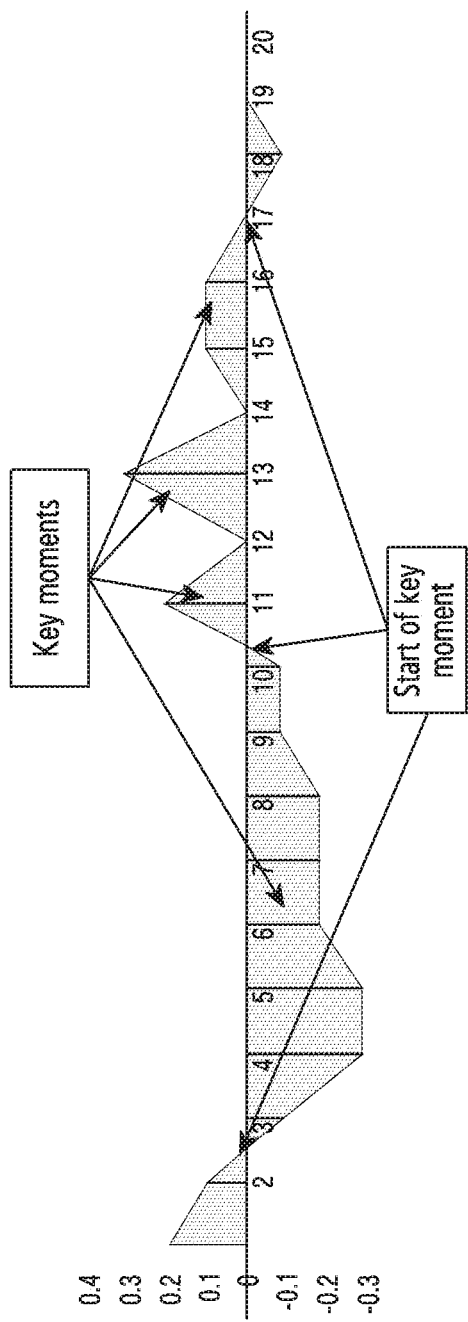
FIG. 4 is a graph illustrating the plurality of key moments in the multimedia content based on the navigational behavior of the user, according to an embodiment of the disclosure.

FIG. 4 is a graph illustrating the plurality of key moments in the multimedia content based on the navigational behavior of the user, according to an embodiment of the disclosure.

Referring to FIG. 4, consider an example scenario in which ten users watch a multimedia content (e.g., video) on the electronic device 100 at different time intervals. The multimedia content is of duration 20 sec with 1 sec as unit time frame. Further, consider that all the ten users have a similar user profile. The key moments management engine 120 determines the navigation behavior of each of the ten users of the multimedia content during playback. By learning the navigation behavior of multiple users on the same multimedia content, the frames of interest are calculated. The events associated with the navigation behavior of the users on the multimedia content are watched, not watched, skipped and watched again. The events are provided with weights as shown in Table. 2.

TABLE 2

| Event | Weight | Assumptions |
| --- | --- | --- |
| Watched | 0 | C1 = 0, wF = 0 |
| Not Watched | 0 | C2 = 0, nwF = 0 |
| Skipped | −1 | C3 = −1, sF = 0 |
| Watched again | 1 | C4 = 1, rwF = 0 |

Further, for each unit frame of the multimedia content, the average weighted score is calculated for the different events performed by all the ten users based on the user profiles, as shown in Table. 3.

TABLE 3

| Test profile | Timeline | | | | | | | | | | | | | | | | | | | |
| --- | --- | --- | --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 | 17 | 18 | 19 | 20 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | −1 | −1 | −1 | 0 | 0 | 0 | 0 | 0 | 1 | 0 | 0 | 0 | 0 | 0 | 0 | 0 | 0 | 0 |
| 3 | 0 | −1 | −1 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 1 | 1 | 1 | 1 | 1 | 0 | 0 | 0 |
| 5 | 0 | 0 | 0 | −1 | −1 | −1 | 0 | 0 | −1 | −1 | −1 | −1 | 0 | 0 | 0 | 0 | 0 | 0 | 0 | 0 |
| 6 | 0 | 0 | −1 | 0 | −1 | −1 | −1 | −1 | 0 | 0 | 0 | 0 | 1 | 0 | 0 | 0 | 0 | 0 | 0 | 0 |
| 7 | 0 | 0 | 1 | 1 | 1 | 0 | 0 | 0 | 0 | 0 | 0 | 0 | 0 | 0 | 0 | 0 | 0 | 0 | 0 | 0 |
| 8 | 0 | 0 | −1 | −1 | 0 | 0 | −1 | −1 | 0 | 0 | 0 | −1 | −1 | −1 | 0 | 0 | −1 | −1 | 0 | 0 |
| 9 | 2 | 2 | 2 | −1 | −1 | 0 | 0 | 0 | 0 | 0 | 2 | 2 | 2 | 0 | 0 | 0 | 0 | 0 | 0 | 0 |
| Avg. weights | 0.2 | 0.1 | −0.1 | −0.3 | −0.3 | −0.2 | −0.2 | −0.2 | −0.1 | −0.1 | 0.2 | 0 | 0.3 | 0 | 0.1 | 0.1 | 0 | −0.1 | 0 | 0 |

$\text{Suf} = (\Sigma(\Sigma(\text{score of session})/\text{total sessions}) \times \text{profile score})/\text{total}$ Referring to the FIG. 4, the key moments of the multimedia content are identified based on the average weighted score which is plotted for the entire timeline of the multimedia content.

The frames of the multimedia content having a positive unit frame score constitute the positive key moment. The positive key moment represents the key moment which is desirable or re-watchable portion of the multimedia content. The frames of the multimedia content having a negative unit frame score constitute the negative key moment. The negative key moment represents the key moment which is undesirable or skippable portion of the multimedia content.

Figure 5A:
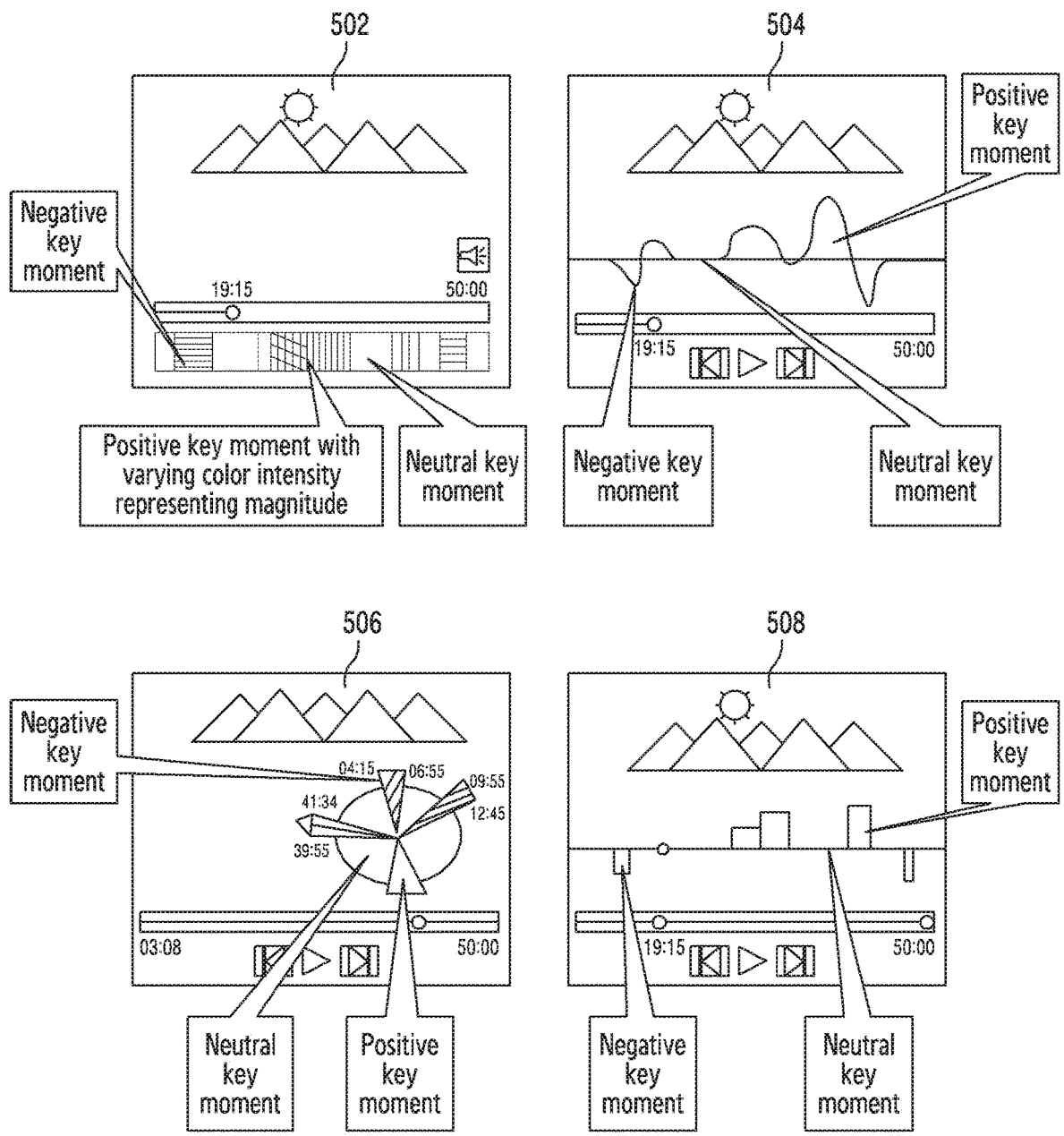
FIGS. 5A and 5B illustrate examples of representation of the plurality of key moments in the multimedia content based on the navigational behavior of the user, according to various embodiments of the disclosure.
Figure 5B:
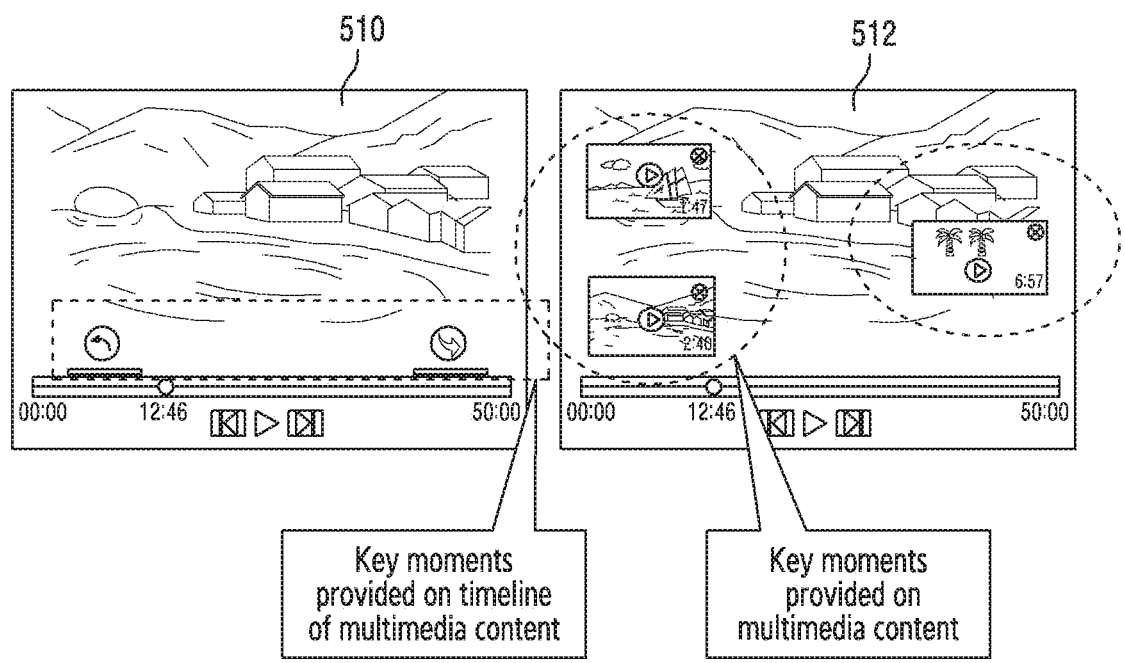

FIGS. 5A and 5B illustrate examples of representation of the plurality of key moments in the multimedia content based on the navigational behavior of the user, according to various embodiments of the disclosure.

Referring to FIGS. 5A and 5B, at 502, the at least one key moment which includes the positive key moments, the negative key moments and the neutral key moments are displayed along the timeline of the multimedia content as a multi-colour bar. The multi-colour bar uses different colours to represent the positive key moments and the negative key moments. Further, the colour intensity may be varied along the multi-colour bar to show the magnitude of the at least one key moment. The magnitude of the at least one key moment is determined based on the average weighed scores. The key moment with a greater magnitude is represented with higher colour intensity and the key moment with lower magnitude is represented with lower colour intensity. Further, the buffered and non-buffered content can also be shown with a different colour gradient. Therefore, the user can directly navigate to the desired key moment or skip the negative key moment with the help of the multi-colour bar provided along the timeline of the multimedia content.

At 504, the at least one key moment which includes the positive key moments, the negative key moments and the neutral key moments are displayed as a graphical seek bar. The graphical seek bar is in the form of a line graph which may include two different colors for the positive key moments and the key moments. An upward curve indicates the positive key moment and downward curve indicates the negative key moment. The height of the curve along Y axis is determined based on the average weighed score of the key moment. Thus, an upward curve with maximum height represents the most important scene in the video. Therefore, the user can directly tap on the graphical seek bar to navigate to a particular key moment in the multimedia content.

At 506, the at least one key moment which includes the positive key moments, the negative key moments and the neutral key moments are displayed as a pie chart. The timeline of the multimedia content is mapped to the pie chart with multiple colors. The different colors in the sections of pie chart represent the positive key moments, the negative key moments and the neutral key moments. (e.g., a green color may represent a positive key moment and a red color may represent a negative key moment, a white color would represent the neutral key moment). The width of a section (e.g., periphery) in the pie chart shows the duration (e.g., positive/negative) of the key moment in the multimedia content. The length of the section in the pie chart shows importance (e.g., positive/negative) of the key moment in multimedia content. Thus, a green colored section with maximum length shows the most important scene in the video. A line pointer depicts the current position in the multimedia content and the line pointer moves along the periphery as the multimedia content progresses. Therefore, the user can tap on any particular section to directly navigate to that key moment.

At 508, the at least one key moment which includes the positive key moments, the negative key moments and the neutral key moments are displayed as a 2D bar graph. The X axis of the bar graph depicts the timeline of the multimedia content and Y axis depicts the magnitude of a particular key moment with positive magnitude representing positive key moment and negative magnitude representing negative key moment. Further, a small dot indicator is shown on the X axis which represents the current position in the multimedia content which moves along the X axis as the multimedia content progresses. The higher the length of the bar (e.g., positive/negative), more is the importance of a key moment (e.g., positive/negative). Therefore, the user can tap on any particular bar to directly navigate to that key moment.

At 510, the at least one key moment which includes the positive key moments and the negative key moments are displayed as along the timeline of the multimedia content. Further, the unique identifier is provided at a position above the timeline where the key moment appears.

At 512, the at least one key moment which includes the positive key moments and the negative key moments are displayed as thumbnails on the multimedia content. Further, the thumbnails of the positive key moments may be displayed on the right side of the screen of the electronic device 100 and the thumbnails of the negative key moments may be displayed on the left side of the screen of the electronic device 100.

Figure 6A:
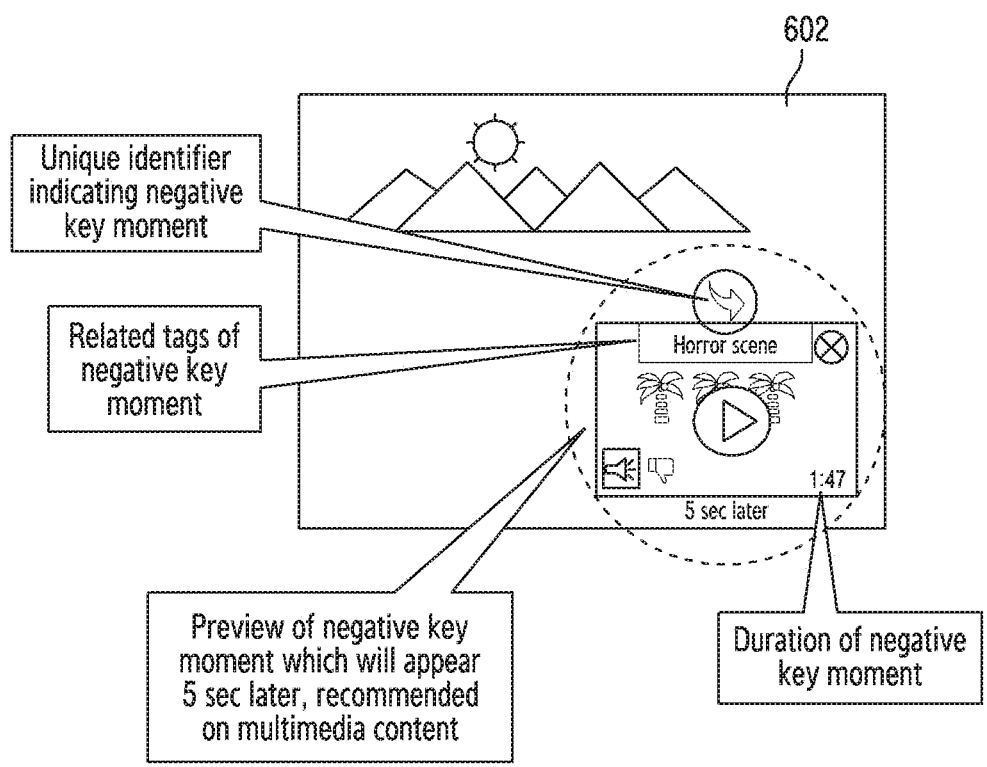
FIGS. 6A and 6B illustrate examples of providing at least one negative key moment on the multimedia content and automatically performing at least one action corresponding to the at least one negative key moment, according to various embodiments of the disclosure.
Figure 6B:
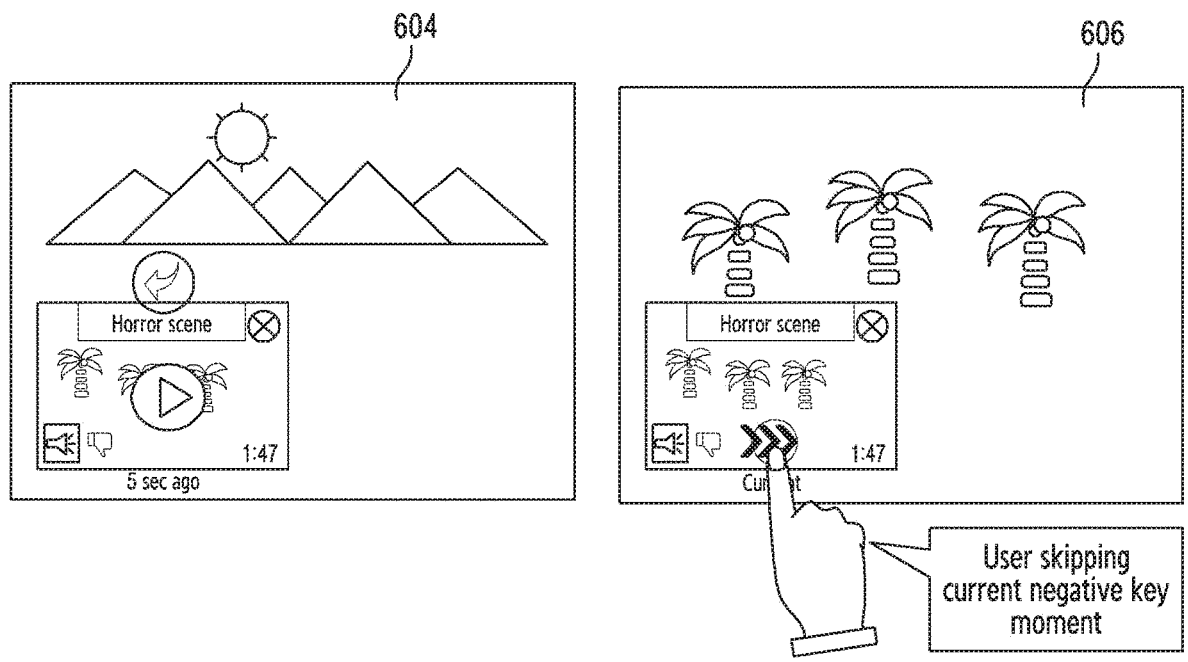

FIGS. 6A and 6B illustrate examples of providing at least one negative key moment on the multimedia content and automatically performing at least one action corresponding to the at least one negative key moment, according to various embodiments of the disclosure.

Referring to FIGS. 6A and 6B, consider a scenario where the user is watching the multimedia content, for example, a video on the electronic device 100. The electronic device 100 determines a segment in the video which is inferred as undesirable, i.e., the negative key moment for the candidate user. Further, the electronic device 100 determines that the negative key moment will appear 5 sec later from the current point of the video being played. At 602, the electronic device 100 will display a preview of the negative key moment along with the unique identifier on the actionable user interface in the portion of the screen of the electronic device 100. Further, the electronic device 100 also provides an option to skip the negative key moment and navigate to the next scene of the multimedia content which will appear after the timestamp of the negative key moment.

In another scenario, the negative key moment has already elapsed while playing the multimedia content and the user has skipped the negative key moment. At 604, the electronic device 100 displays the preview of the last negative key moment for a specific duration of time after the negative key moment has been skipped by the user. The preview of the last negative key moment is displayed along with the instant of time with respect to the current position of the multimedia content when the negative key moment had appeared. Due to the display of the preview of the last negative key moment which has already elapsed, the electronic device 100 provides an option to user to view the skipped negative key moment. Further, if the user skips the negative key moment again, then, the electronic device 100 recalculates the average weight score and reinforces the key moment as the negative key moment.

In another scenario, the current scene of the multimedia content being played overlaps with the negative key moment, as shown in 606. Then electronic device 100 still provides the thumbnail preview along with the option to skip the negative key moment. Therefore, the user can skip the negative key moment even though the negative key moment has started to play. In case the user does not skip a particular segment of the multimedia content which has been previously inferred as the negative key moment then the learning engine 125 recalculates the navigation score for the negative key moment. Further, if the recalculated navigation score for the negative key moment falls above the navigation threshold then the current key moment is redefined as not a negative key moment. Further, other similar pre-identified negative key moments as per current user profile are also updated accordingly. Furthermore, the preview of the negative key moment is not displayed the next time the multimedia content is played.

Figure 7:
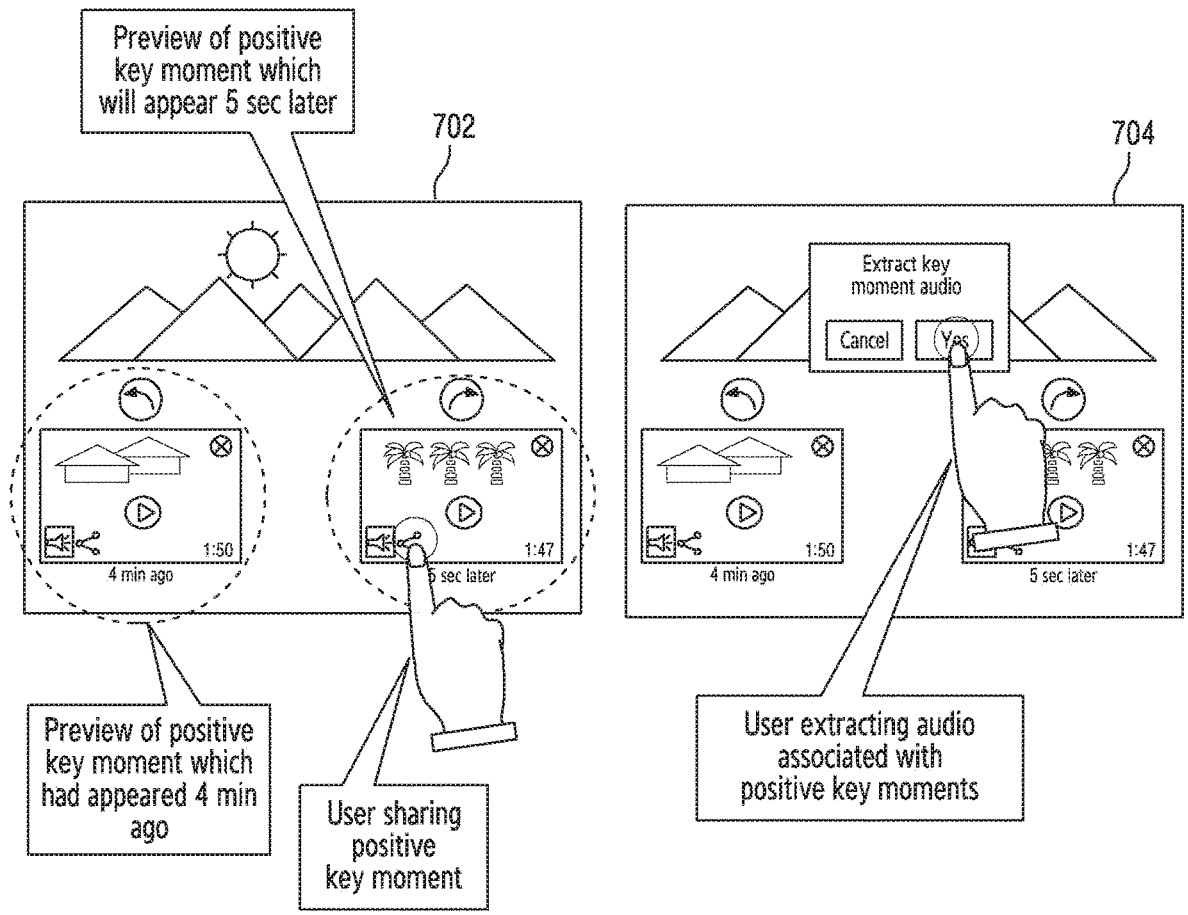
FIG. 7 illustrates examples of providing at least one positive key moment on the multimedia content and automatically performing at least one action corresponding to the at least one positive key moment, according to an embodiment of the disclosure.

FIG. 7 illustrates examples of providing at least one positive key moment on the multimedia content and performing at least one action corresponding to the at least one positive key moment, according to an embodiment of the disclosure.

Referring to FIG. 7, consider a scenario where the user is watching the multimedia content, for example, a video on the electronic device 100. The electronic device 100 determines two positive key moments for the candidate user. Further, the electronic device 100 determines that one of the positive key moments has already elapsed 4 min ago from the current point of the video being played and the next positive key moment will appear 5 sec later from the current point of the video being played. At 702, the electronic device 100 will display a preview of the positive key moments along with the unique identifier on the actionable user interface in the portion of the screen of the electronic device 100. Further, the electronic device 100 also provides an option to replay the positive key moment of the multimedia content.

Further, the positive key moments are displayed with time factor 'f', i.e., after every 'f' time unit, the recommendations of the upcoming positive key moment and/or last positive key moment is displayed on the screen of the electronic device 100 in the form of preview in thumbnail or GIF or a short video clip. Furthermore, each time the positive key moment is re-watched the electronic device 100 recalculates the average weight score and reinforces the key moment as a positive key moment. In case the user skips watching the positive key moment then the electronic device 100 updates the average weight score accordingly.

Furthermore, the electronic device 100 allows the user to perform actions on the key moments (both the positive key moments and the negative key moments). The preview of the key moment also includes options such as sharing the specific positive key moment. The user can select the share option on the positive key moment (as shown in 702) and the electronic device 100 will crop the specific positive key moment from the multimedia content to make it available for sharing that will save time and data of the user. Further, the user can also add feedback, comments to the cropped key moment before sharing the key moment.

At 704, the electronic device 100 also provides the option to extract the audio of the specific positive key moment. Further, the electronic device 100 also allows the user to share the extracted audio content with the other users.

In another example, when the user is watching the multimedia content, some notification pop-ups are provided on the electronic device 100 with a notification sound which interrupts the video. Further, the notification pop-ups may overlap some portion of the by the multimedia content. In the proposed method, when the user is watching the positive key moment, the notification pop-ups may be delayed and display the notification pop-up after when the positive key moment is played.

In yet another example, when the user is watching the multimedia content, the user may vary the volume level for different portions of the multimedia content. In the proposed method, the electronic device 100 learns the user behavior of varying the volume level with respect to the key moments and provides suggestions for increasing/decreasing the volume level for the key moments ahead. Further, the volume level suggestion feature can be automated using the auto mode.

Figure 8A:
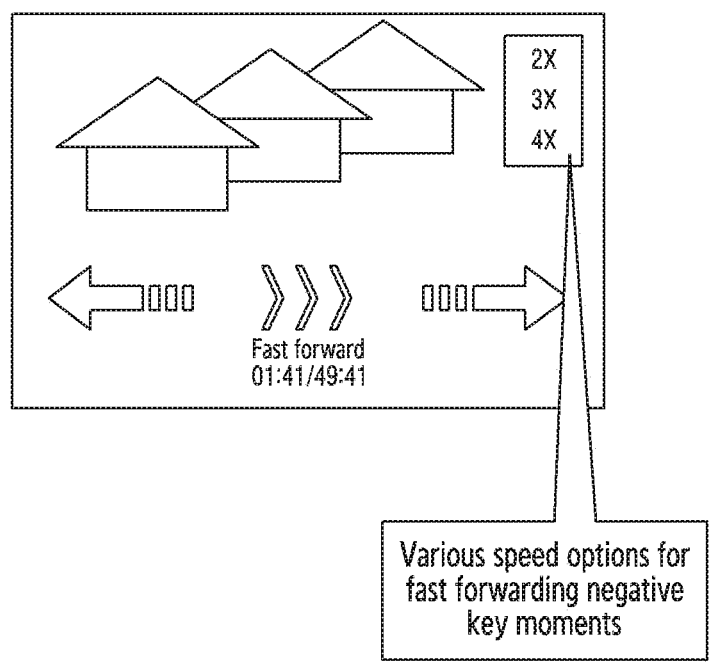
FIGS. 8A and 8B are examples illustrating automatically performing at least one action corresponding to the at least one key moment in an auto mode, according to various embodiments of the disclosure.
Figure 8B:
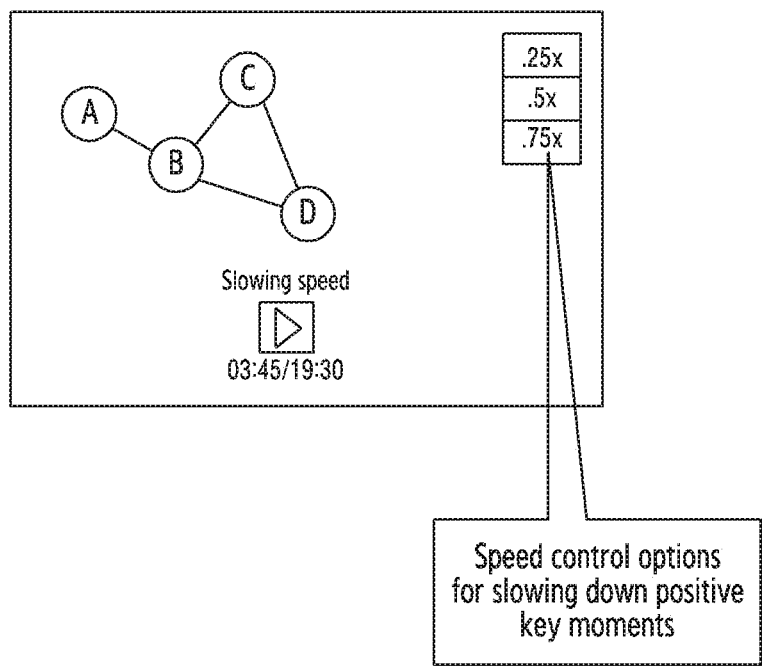

FIGS. 8A and 8B are examples illustrating automatically performing at least one action corresponding to the at least one key moment in an auto mode, according to various embodiments of the disclosure.

Consider that the auto mode is enabled when the multimedia content is played on the electronic device 100.

Referring to FIG. 8A, when the auto mode is enabled, the timestamp associated with the multimedia content which are categorized as the negative key moment are automatically fast forwarded by the electronic device 100. Further, in the auto mode the user is provided with the various speed options for fast forwarding the negative key moments (e.g., to increase the fast-forwarding speed of the negative key moments by 2, 3 or 4 times). Further, the user can also undo the fast forwarding and move to the start position of the current negative key moment. The video segment will continue to play and the electronic device 100 will be updated the same. In the auto mode the user can also directly navigate to the end of the specific negative key moment automatically and the following segment of the multimedia content will be automatically played. Further, when the user wants to stop the automatic fast forwarding of the negative key moments, then the user will have to tap anywhere on the screen of the electronic device 100 and the multimedia content will continue playing from the current time instant.

Referring to FIG. 8B, consider the auto mode is enabled and the timestamp associated with the multimedia content which are categorized as the positive key moment appears. The electronic device 100 slows down the playing speed of the multimedia content during the positive key moment which requires more attention or focus.

For example, when an educational tutorial is played the positive key moments which require more focus are identified as per user's interest and navigation behavior. However, the electronic device 100 also provides the option to change the focus speed of the positive key moment of the multimedia content.

Figure 9:
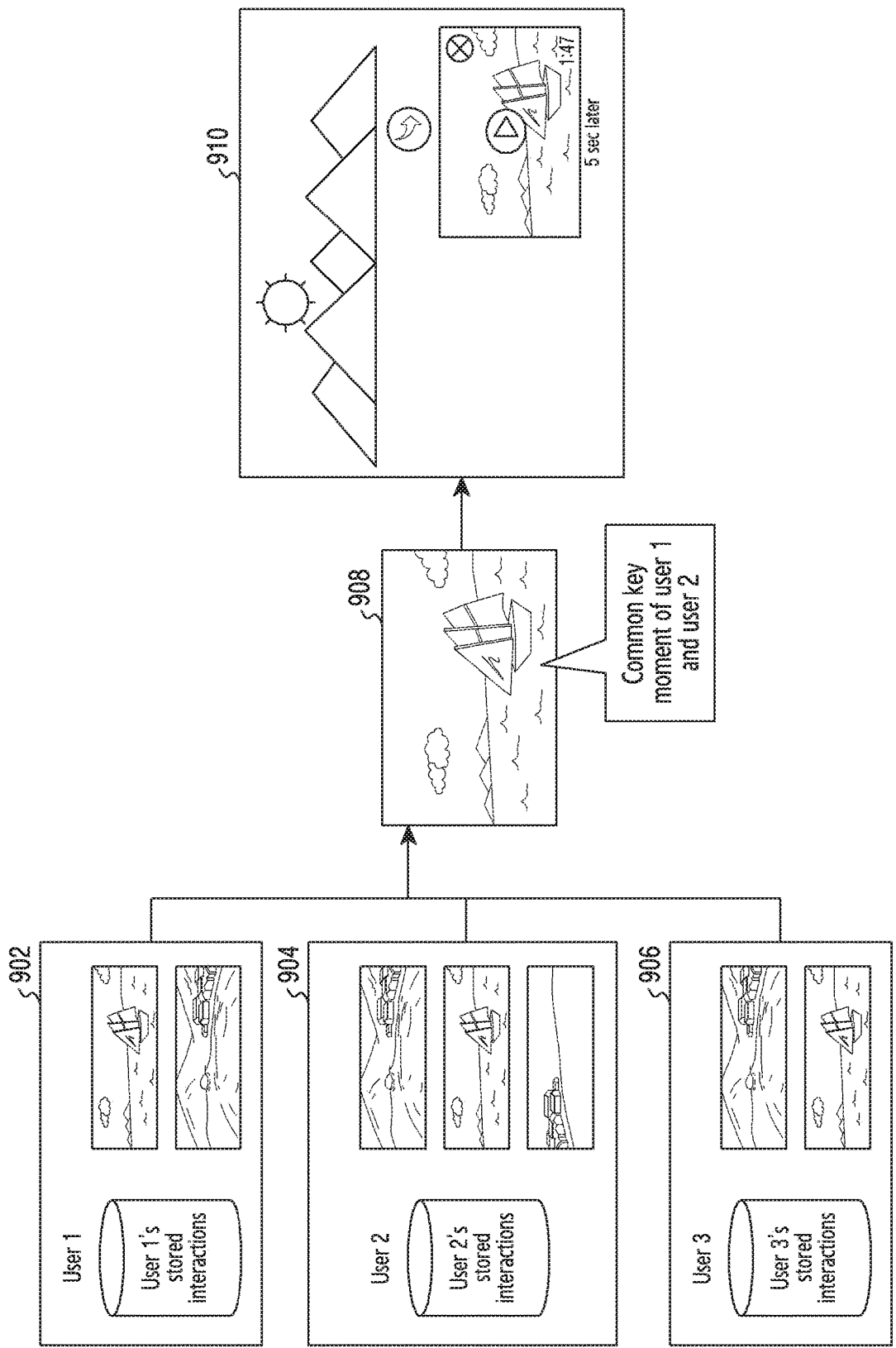
FIG. 9 is an example illustrating determination of key moments when multiple users are watching the multimedia content, according to an embodiment of the disclosure.

FIG. 9 is an example illustrating the determination of key moments when multiple users are watching the multimedia content, according to an embodiment of the disclosure.

Referring to FIG. 9, consider a scenario where three users, i.e., user 1, user 2 and user 3 are watching the same multimedia content. The user 1, the user 2 and the user 3 have different interests and different interactions with the multimedia content. Therefore, a situation may arise where the user 1 wants to skip some portion of the multimedia content or re-watch some portion content of the multimedia content. In the conventional methods and systems, the action has to be manually performed since there is no prior intimation or navigation medium, In the proposed method, the electronic device 100 identifies the user 1, the user 2 and the user 3 who are currently interacting with the multimedia content, based on the face recognition. Further, at operation 902 the electronic device 100 determines the interests and navigation behavior of the user 1, at operation 904 the electronic device 100 determines the interests and navigation behavior of the user 2 and at operation 906 the electronic device 100 determines the interests and navigation behavior of the user 3.

The interest and non-interest categories of the multimedia content are identified by intersection of every user's interests. Further, the interest categories can be identified using content types and key-moments tagging behavior, as shown in Table. 4.

TABLE 4

|        | Comedy | Horror | Romance | Adult |
|--------|--------|--------|---------|-------|
| User 1 | Yes    | Yes    |         | Yes   |
| User 2 | Yes    | No     | Yes     | No    |
| User 3 | Yes    | Yes    |         |       |

Therefore, based on the Table 4, for the user 1 and the user 2 the comedy scenes become positive key moments while horror and adult become negative key moments. Further, for the user 1 and the user 3, comedy, horror and adult scenes become positive key moments. At operation 908, the electronic device 100 determines the positive key moments and the negative key moments with respect to all the users. Further, at operation 910, the electronic device 100 provides automatic suggestions for the positive key moment and the negative key moment based on the interest of all the users watching the multimedia content.

In another embodiment, when multiple users are watching the same multimedia content together, there will arise scenarios where different users do not understand some part of the multimedia content due to language or ambiguity, hence feel the need to switch on the subtitles. In the proposed method, the electronic device 100 intelligently identifies the common set of languages known to the three users based on the user profiles, as shown in Table 5. Further, based on the common languages the subtitles switch suggestions of the specific language will be provided for the multimedia content.

TABLE 5

| Users  | English | Hindi | Spanish |
|--------|---------|-------|---------|
| User 1 | Yes     | Yes   | Yes     |
| User 2 | Yes     | No    | Yes     |
| User 3 | Yes     | Yes   | No      |

Therefore, based on the Table. 5, the English language subtitles will be shown in the multimedia content as it is the common language known among all the three users watching the multimedia content.

Figure 10:
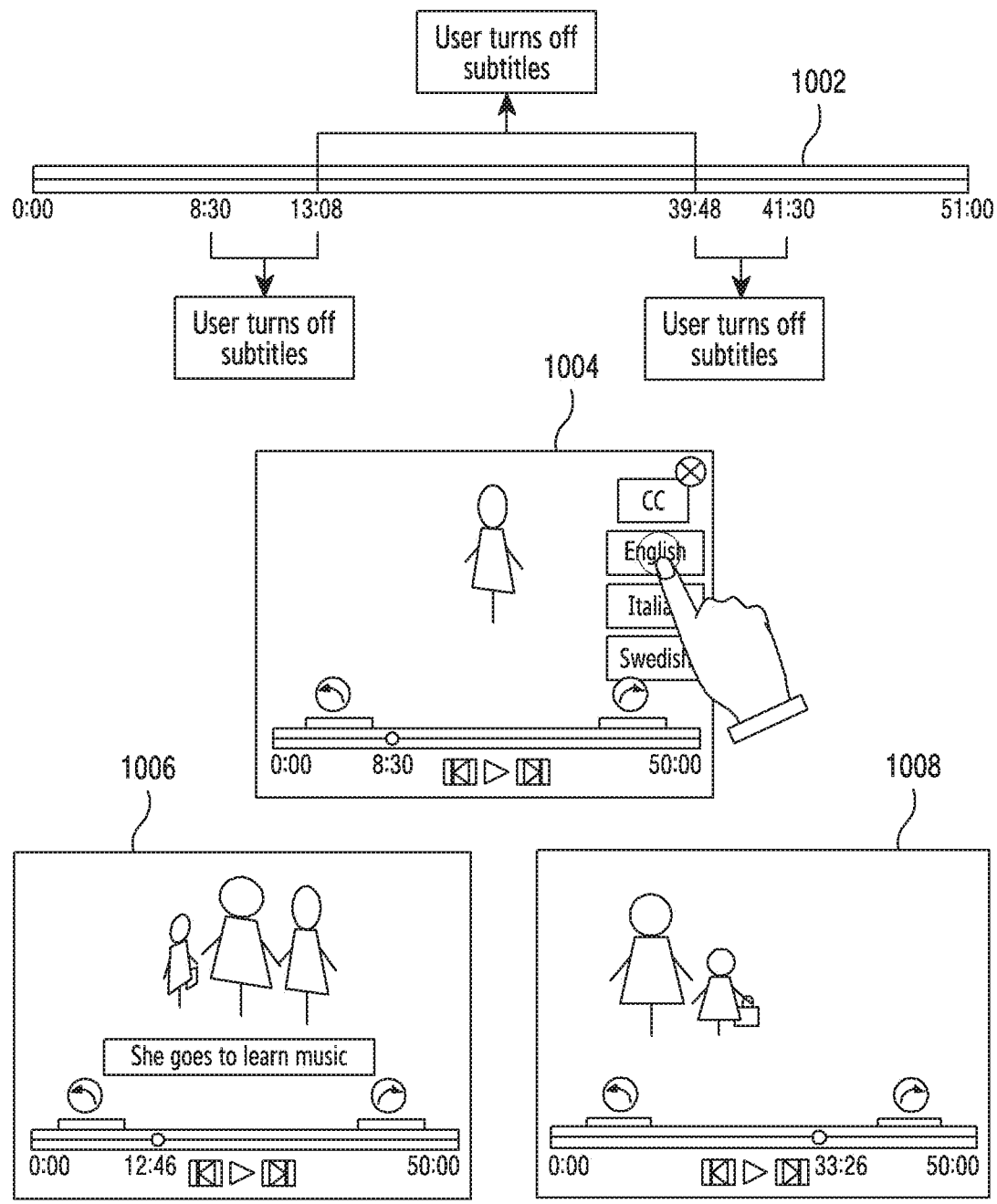
FIG. 10 is an example illustrating an automatic switching of a subtitle in the multimedia content based on the navigation behavior of the user, according to an embodiment of the disclosure.

FIG. 10 is an example illustrating the automatic switching of the subtitle in the multimedia content based on the navigation behavior of the user, according to an embodiment of the disclosure.

Referring to FIG. 10, at operation 1002, consider a video of a specific genre which has been played by multiple users. The video includes segments where 'Italian' language has been in duration between 8.30-13:08 mins and 39:48-41:30 mins within the video. Due to the presence of the 'Italian' language in the video, the multiple users who watched the video had switched on the subtitles in English between 8.30-13:08 mins and 39:48-41:30 mins of the video. Further, for the portions of the video which did not include the 'Italian' language, the multiple users had switched off the subtitles in English. Further, the subtitles interaction behavior of the multiple users within the multimedia content is saved based on the event type.

At operation 1004, the candidate user watches a multimedia content of the same genre as that of the multimedia content in 1002. At a time instant of 8.30 min, the electronic device 100 determines that the multimedia content includes the 'Italian' language content. Therefore, based on learning of multiple users' subtitles interaction behavior to turn on/off subtitles and switch languages the electronic device 100 provides recommendations for subtitles to the candidate user, as shown in 1006. Further, once the portion of the video with the 'Italian' language content is elapsed, the subtitles are automatically switched off, as shown in 1008.

Figure 11:
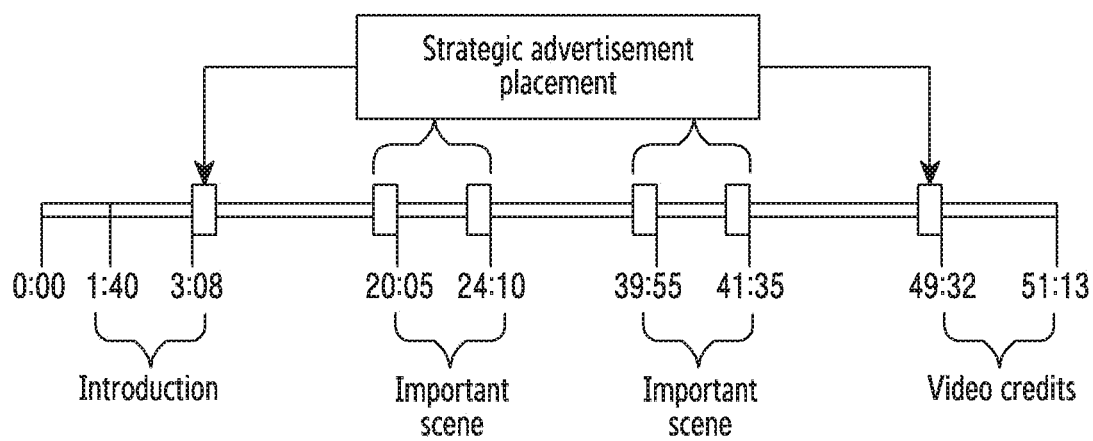
FIG. 11 is an example illustrating strategic advertisement placement in the multimedia content based on the navigation behavior of the user, according to an embodiment of the disclosure.

FIG. 11 is an example illustrating strategic advertisement placement in the multimedia content based on the navigation behavior of the user, according to an embodiment of the disclosure.

In the conventional methods and systems, the advertisement is randomly placed between various segments of the multimedia content.

Referring to FIG. 11, the electronic device 100 uses the classified key moments and the deviation points to determine the positions in the multimedia content for the strategic advertisement placement. The strategic advertisement placement is done for maximizing revenue generation. The strategic advertisement placement will be a dynamic process as the user navigation behavior is monitored while playing the multimedia content.

For example, the advertisements can be placed just before the starting point of the positive key moment, in-between the positive key moment and at the end of the negative key moment to ensure maximum viewership for the advertisements.

Figure 12:
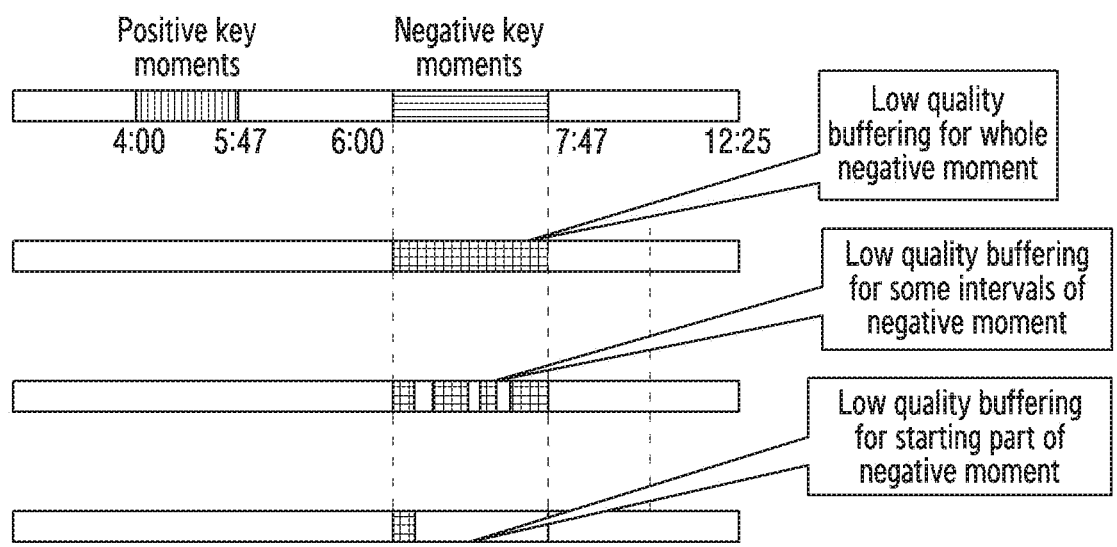
FIG. 12 is an example illustration for determining buffering quality of the at least one key moment of the multimedia content, according to an embodiment of the disclosure.

FIG. 12 is an example illustration for determining buffering quality of the at least one key moment of the multimedia content, according to an embodiment of the disclosure.

Referring to FIG. 12, the electronic device 100 uses the key moments which are determined and classified as the positive key moment and the negative key moment in determining the buffering quality of the various segments of the multimedia content. The buffering quality can be set as high for the neutral key moments and the positive key moments. However, for the negative key moments the buffering can be done in various ways such as one of providing low quality buffering for the entire negative key moment, providing low quality buffering for some intervals of the negative key moment, providing low quality buffering for only a portion of the negative key moment and skip buffering for the entire negative key moment.

The varying buffering provided for the negative key moment when compared to the positive key moment and the neutral key moments, helps in saving mobile data and also the processing time of the electronic device 100. Therefore, the varying buffering provided based on the different types of the key moments enhances the efficiency of the electronic device 100.

Further, if the user starts watching any negative key moment of the multimedia content then the buffering will start immediately for the negative key moment, if the negative key moment is not already buffered. Also, if the resolution of the negative key moment is low then a high content buffering will be provided by the electronic device 100.

Figure 13:
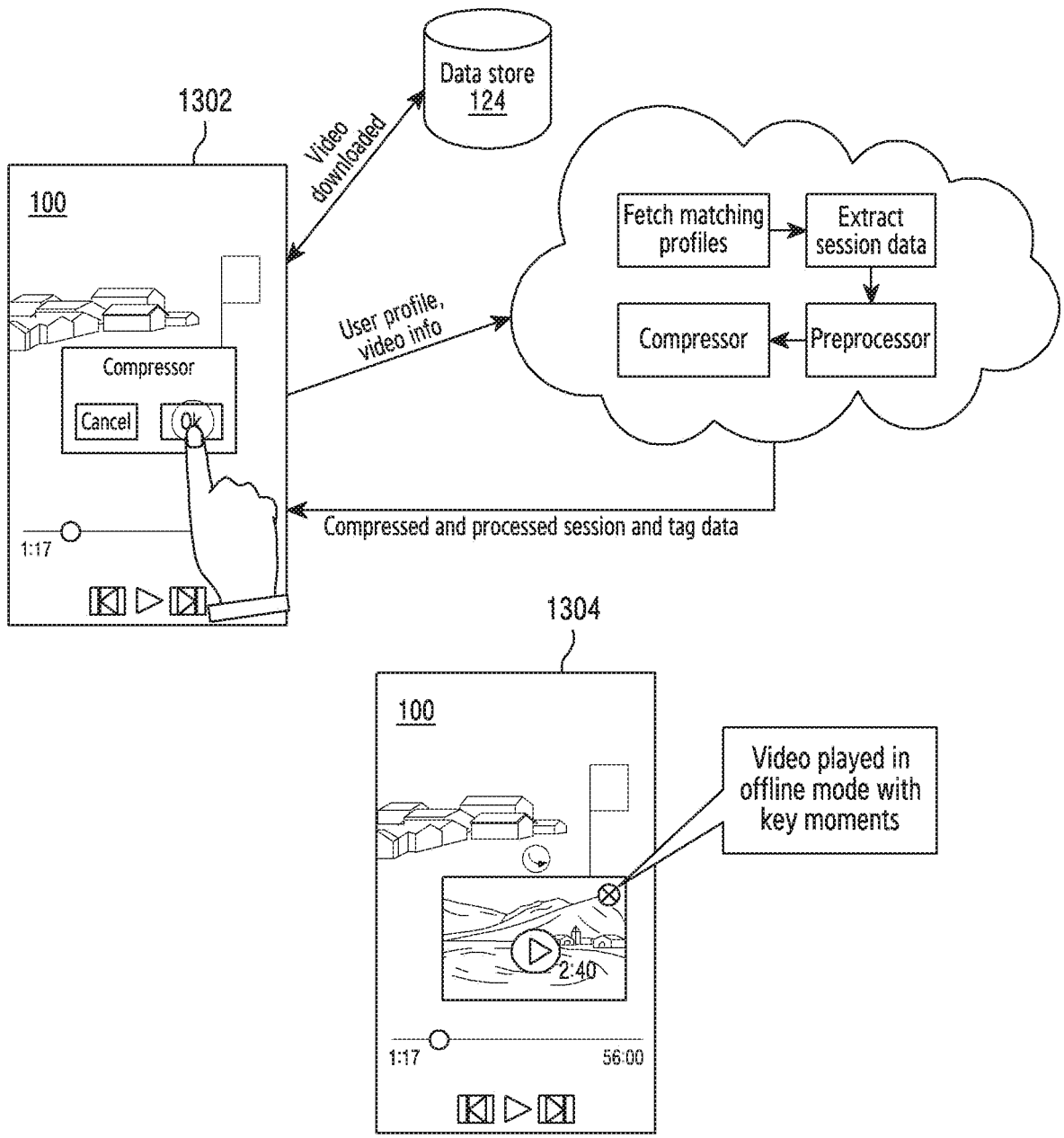
FIG. 13 is an example illustration for automatically providing the at least one key moment in the multimedia content when the electronic device is in offline mode, according to an embodiment of the disclosure.

FIG. 13 is an example illustration for automatically providing the at least one key moment in the multimedia content when the electronic device 100 is in offline mode, according to an embodiment of the disclosure.

Referring to FIG. 13, consider that the offline mode is enabled for the multimedia content in the electronic device 100. Therefore, at operation 1302, the electronic device 100 downloads the multimedia content along with a fingerprint of the key moments for the candidate user profile from a central server/cloud. The fingerprint of the key moments includes the compressed form of preprocessed session data of all the matching profiles of other users with the candidate user profile for the multimedia content and the preprocessed tag data of individual timestamps of the multimedia content.

At operation 1304, the multimedia content is played locally on the electronic device 100 along with the key moment(s) recommendation provided based on the fingerprint of the key moment obtained at operation 1302. Further, the electronic device 100 also determines the user navigation behavior and the interactions of the candidate user on the multimedia content, which are saved locally. Furthermore, when the electronic device 100 is switched from the offline mode to the online mode, the saved navigation data and interactions of the candidate user on the multimedia content are uploaded to the central server/cloud. Further, the related key moment data and profile data extractors are updated to recalculate the average weighed score according to new data.

Figure 14A:
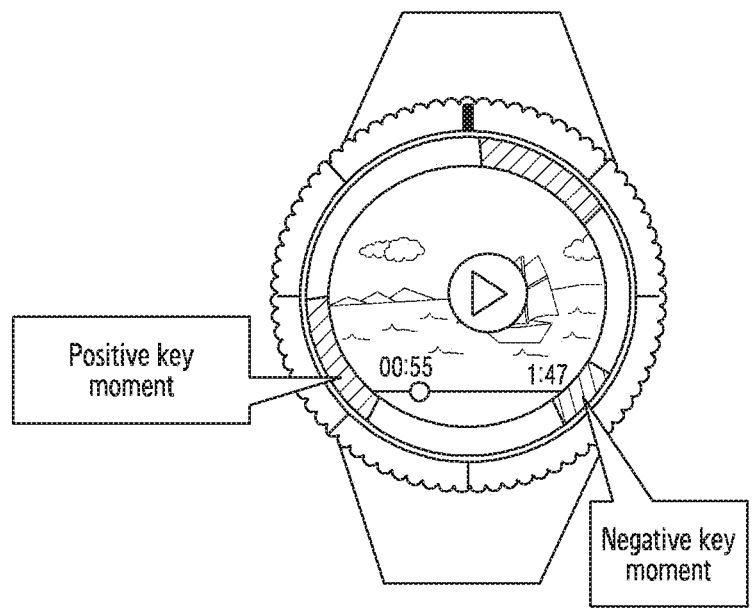
FIG. 14A is an example illustration for automatically providing the key moments in the multimedia content on a wearable electronic device, according to an embodiment of the disclosure.

FIG. 14A is an example illustration for automatically providing the key moments in the multimedia content on a wearable electronic device 100, according to an embodiment of the disclosure.

Referring to FIG. 14A, consider that the electronic device 100 for automatically providing the key moments in the multimedia content is the wearable electronic device 100. Therefore, the key moments in the multimedia content which includes the positive key moment, the negative key moment and the neutral key moment are provided as circular multi-color bar along a circumference of the screen of the wearable electronic device 100. Different colors are used to represent the positive key moment, the negative key moment and the neutral key moment. Further, varying color intensity may be provided to indicate the magnitude of the key moments. The key moments with greater magnitude, i.e., the key moments with the navigation score much higher than the navigation threshold are represented with higher color intensity. Similarly, the key moment with lower magnitude, i.e., the key moments with the navigation score near to the navigation threshold are represented with lower color intensity. The user can directly navigate to the desired the key moment or skip the negative key moment by using a bezel/crown or display of the wearable electronic device 100.

Figure 14B:
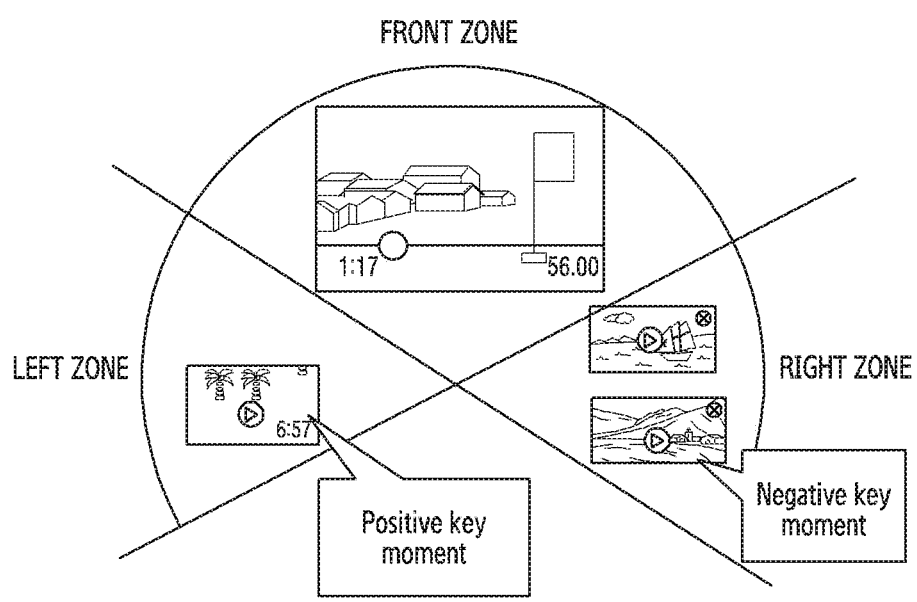
FIG. 14B is an example illustration for automatically providing the key moments in the multimedia content in virtual reality (VR), according to an embodiment of the disclosure.

FIG. 14B is an example illustration for automatically providing the key moments in the multimedia content in virtual reality (VR), according to an embodiment of the disclosure.

Referring to FIG. 14B, consider that the electronic device 100 for automatically providing the key moments in the multimedia content is a VR device. Therefore, the key moments in the multimedia content which includes the positive key moment, the negative key moment and the neutral key moment are provided in different zones of the VR device. The VR device includes three zones, i.e., a front zone, a right zone and a left zone.

The front zone is the portion of the VR device where the main view or the front view is provided and is represented by a wide angle. The multimedia content playback in the virtual reality is provided in the front zone of the VR device. The left zone is the portion of the VR device where the view is presented when user rotates their head in an anti-clockwise direction to view the contents at the left portion of the multimedia content being played. In the left zone of the VR device, the key moments which appear before the current position in the multimedia content may be provided. In another embodiment, the left zone of the VR device may display only a specific type of key moments e.g., the positive key moments.

The right zone is the portion of the VR device where the view is presented when user rotates their head in a clockwise direction to view the contents at the right portion of the multimedia content being played. In the right zone of the VR device, the key moments which appear after the current position in the multimedia content may be provided. In another embodiment, the right zone of the VR device may display only a specific type of key moments e.g., the negative key moments.

Further, based on the number of key moments in the multimedia content with respect to the current position, the previews of the key moments are provided in the VR device when the user rotates their head either in the clockwise or anti-clockwise direction.

Figure 15A:
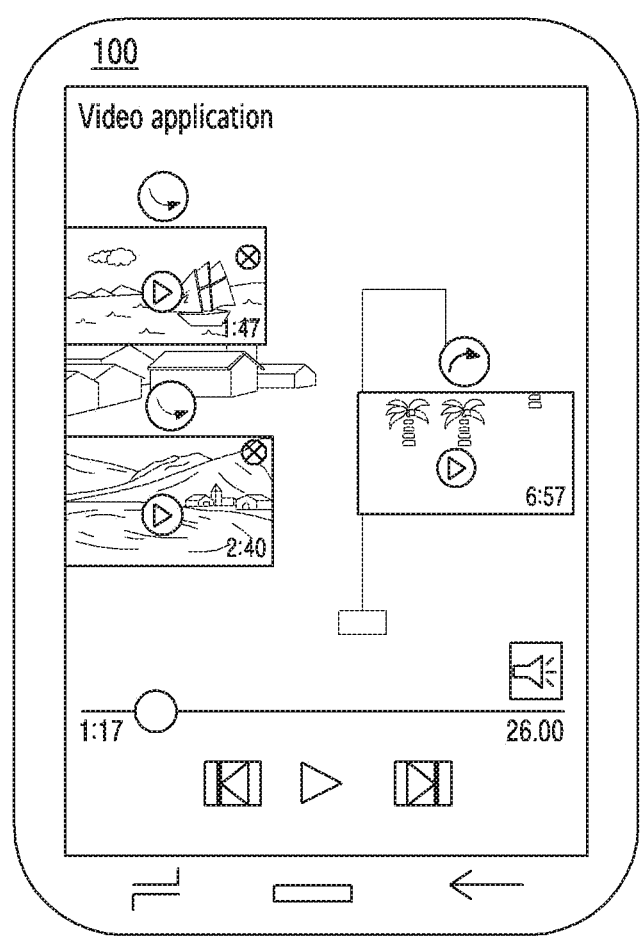
FIGS. 15A and 15B are example illustrations for automatically providing the key moments in the multimedia content in various types of electronic devices, according to various embodiments of the disclosure.
Figure 15B:
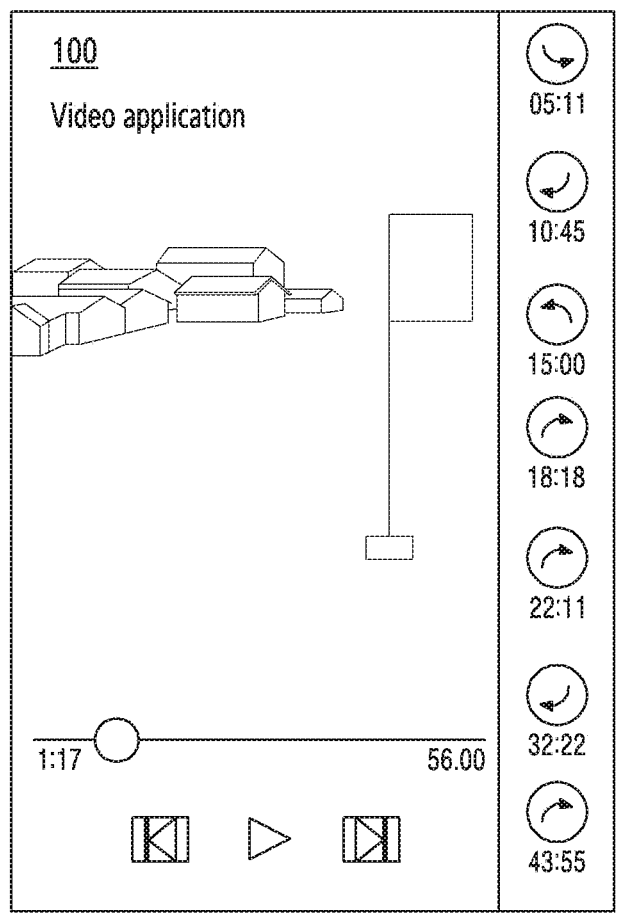

FIGS. 15A and 15B are example illustrations for automatically providing the key moments in the multimedia content in various types of electronic devices, according to an embodiment of the disclosure.

Generally, the actionable user interface may not be displayed always on the screen of the electronic device 100. In the proposed method, the actionable user interface includes the at least one key moment and the actionable user interface is displayed on the at least one of the timeline of the multimedia content, at least one portion of the screen of the electronic device 100 and at least one portion of the multimedia content.

Referring to FIG. 15A, the left zone of the actionable user interface displays the key moments before the current position in the video and the right zone of the actionable user interface displays the key moments after the current position in the video.

In another embodiment, the left zone of the actionable user interface displays only the negative key moments. And the right zone of the actionable user interface displays only the positive key moments.

In the actionable user interface, the previews of the key moments are shown to the user, which the user can scroll vertically to view more previews. Depending on the number of key moments in the video relative to the current position, there can be single or multiple previews.

Referring to FIG. 15B, the devices with separate edge panel (another form of actionable user interface) can be used to show all the key moments in the video. The edge panel is accessed by manually opening the edge panel or when a particular key moment is about to appear. The timestamp is shown along with the arrow icon for the positive key moment and the negative key moment. The user can directly navigate to desired key moment or skip a negative key moment with the help of this representation.

Figure 16:
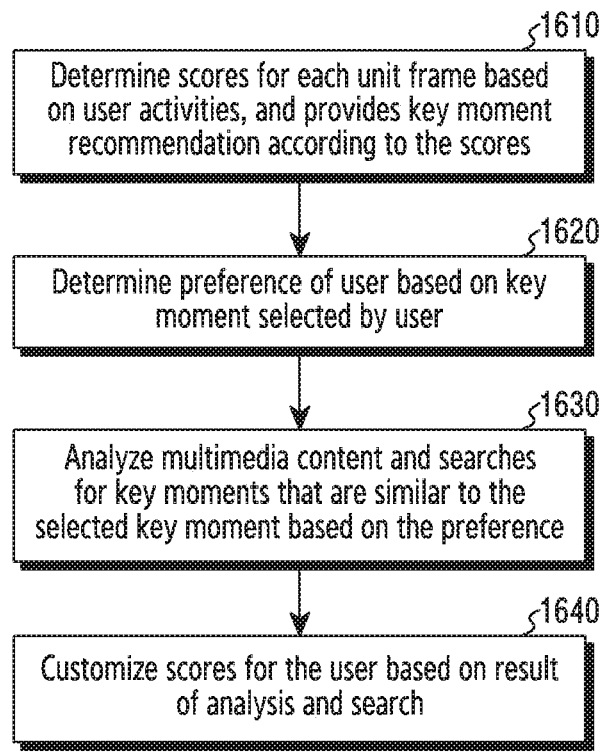
FIG. 16 is a flow chart illustrating a method for customizing scores based on preference of a user, according to an embodiment of the disclosure.

FIG. 16 is a flow chart illustrating a method for customizing scores based on preference of a user, according to an embodiment of the disclosure.

Referring to FIG. 16, at operation 1610, the electronic device 100 determines scores for each unit frame based on user activities, and provides key moment recommendation according to the scores.

At operation 1620, the electronic device 100 determines a preference of the user based on at least one key moment that is selected by the user. The electronic device 100 monitors which key moment is selected by the user, and determines the preference of the user. The preference of the user may be determined based on information regarding the user and/or events related to activities of the user.

At operation 1630, the electronic device 100 analyzes a multimedia content and searches for key moments that are similar to the selected key moment based on the preference of the user.

At operation 1640, the electronic device 100 adjusts the scores, that is, customizes the scores for the user based on a result of the analysis and the search. For example, the electronic device 100 may increase or the decrease a score of the searched key moment.

Figure 17:
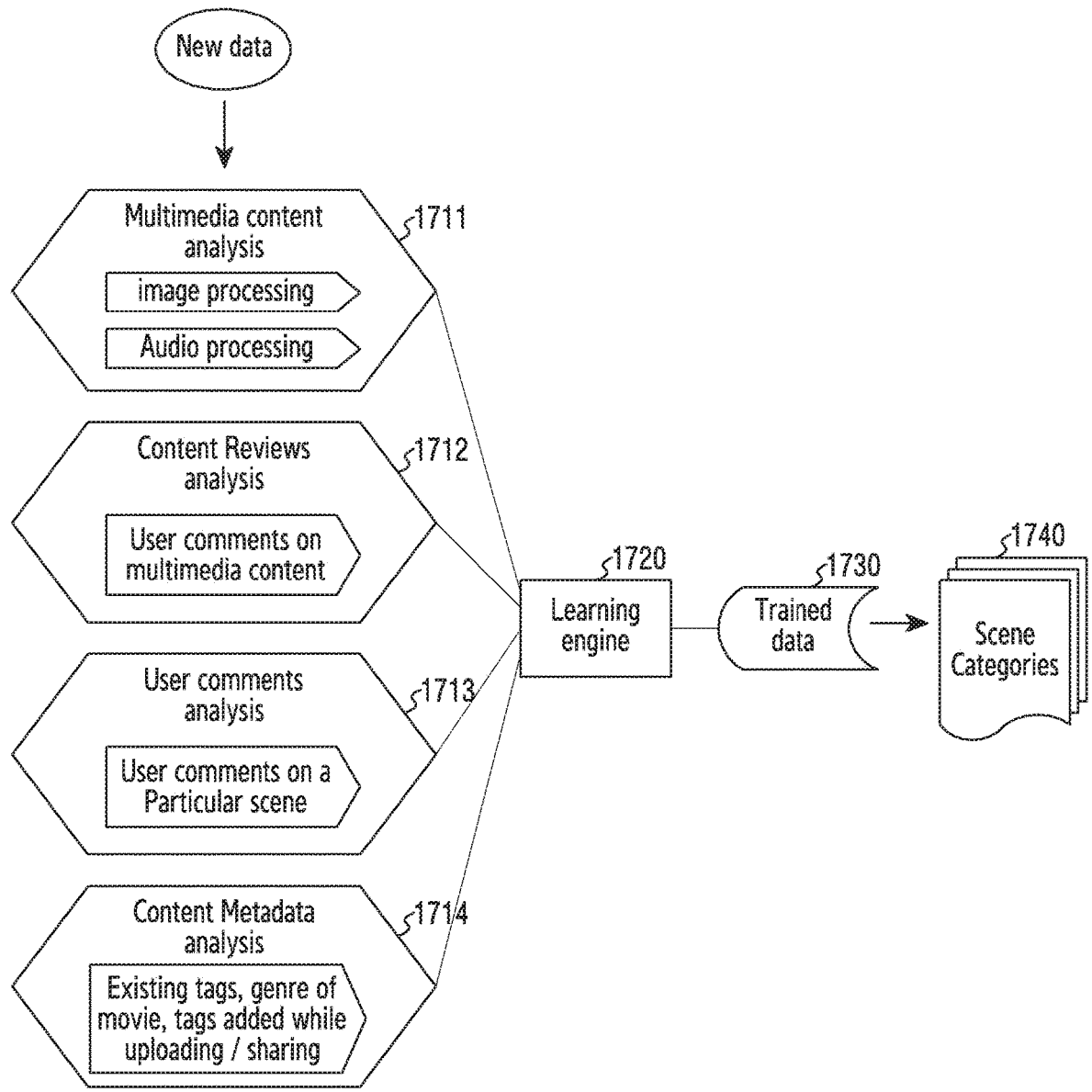
FIG. 17 is an example illustration for classifying key moments, according to an embodiment of the disclosure.

FIG. 17 is an example illustration for classifying key moments, according to an embodiment of the disclosure.

Referring to FIG. 17, the key moments may be classified by using a machine learning. The electronic device may perform content analysis to determine the scene type on data set including various features such as a multimedia content, content reviews, user comments and/or content metadata.

Specifically, a multimedia content analysis unit 1711 analyzes the content of the multimedia using image processing and audio processing. The multimedia content analysis unit 1711 identifies scenes and determines the type of the scene by analyzing motions or audio of the content. For example, if any multimedia content has fighting scenes or car racing scenes, then the multimedia content analysis unit 1711 would identify it as an action key moment.

A content reviews analysis unit 1712 performs content analysis on the reviews shared by the users on the multimedia content. The content reviews analysis unit 1712 analyzes a sentiment of the user comments using machine learning and thus tags the multimedia based on these reviews.

A user comments analysis unit 1713 analyzes comments of the user for particular key moment to extract the type of scene in key moment. For example, if user comments "Best fighting scene ever" on a particular key moment then our solution will detect it as action key moment.

A content metadata analysis unit 1714 uses available tags on the multimedia content. For example, the content metadata analysis unit 1714 identifies a genre of a movie or tags defined by the person uploading or sharing the content.

A learning engine 1720 performs machine learning by using data from analysis units (e.g., the multimedia content analysis unit 1711, the content reviews analysis unit 1712, the user comments analysis unit 1713 and/or content metadata analysis unit 1714). The learning engine 1720 generates trained data 1730. The trained data 1730 may be used to classify scene into scene categories 1740.

Figure 18:
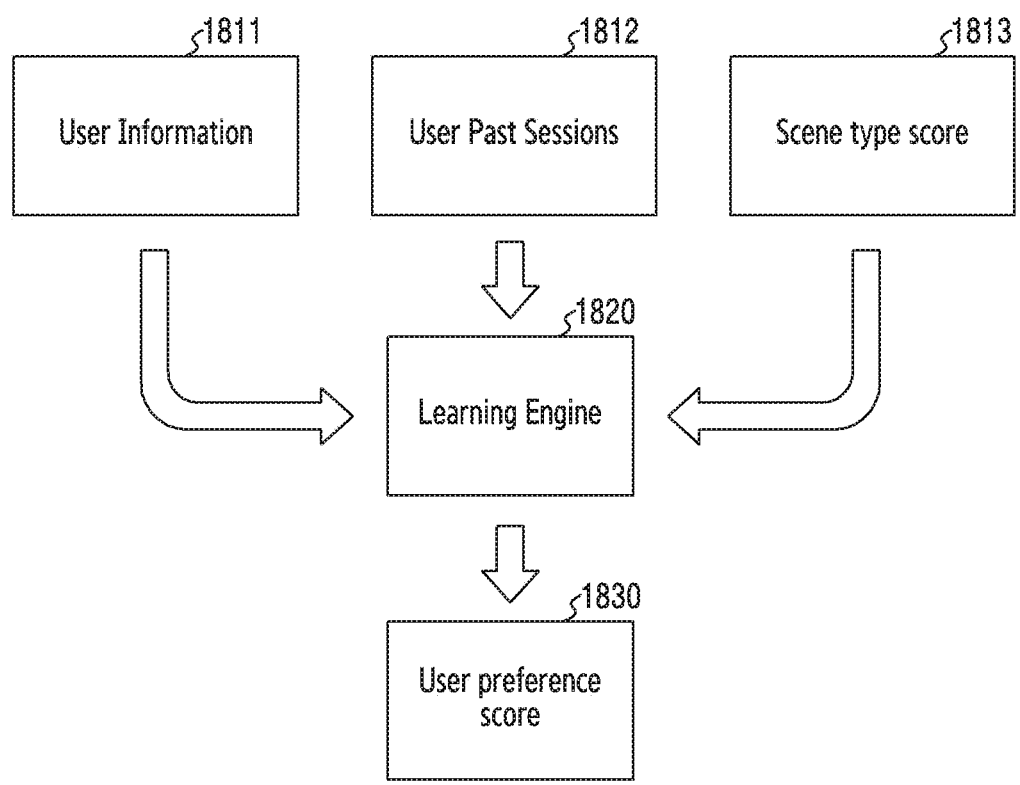
FIG. 18 is an example illustration for determining a preference of a user, according to an embodiment of the disclosure.

FIG. 18 is an example illustration for determining a preference of a user, according to an embodiment of the disclosure.

Referring to FIG. 18, the preference of the user may be represented by user preference score 1830. The user preference score 1830 may be determined by a learning engine 1820 by using user information 1811, user past sessions 1812 and scene type scores 1813. For example, from provided user information, the user profile is determined based on the user information 1811. The user information 1811 includes at least one of an age, a gender, a location, a past history, interests, a language preference, an IP address information and so on. The user past sessions 1812 includes at least one of user activity (e.g., at least one event shown in Table 1). A unique profile score will be generated for each user based on that user's interests, a social interaction, and a previous history. Profiles and session data are fetched and are used to identify scene preference for the user. The scene type scores 1813 are determined based on session data of users with matching profiles.

In an embodiment, for each scene type, the electronic device calculates scene type scores as per activity in each session. For example, the score of each scene type may be determined by:

(Σ(Σ(score of session)/total sessions)×profile score)/total users.

Then, the electronic device finds an average session score for each user. The electronic device determines an average score based on the average session score and the user profile score. Herein, weighted scores of scene type score are used to make graphical seek bar and identify user preferences based on the scene type score.

While the disclosure has been shown and described with reference to various embodiments thereof it will be understood by those skilled in the art that various changes in form and details may be made therein without departing from the spirit and scope of the disclosure as defined by the appended claims and their equivalents.

What is claimed is:

1. A method for operating an electronic device, the method comprising:
    determining a navigation behavior of each user of a multimedia content during playback;
    determining a plurality of key moments in the multimedia content based on the navigational behavior, the plurality of key moments including a positive key moment, a negative key moment, and a neutral key moment;
    storing the plurality of key moments;
    detecting a playback event of the multimedia content by a candidate user;
    retrieving at least one key moment from the plurality of key moments in the multimedia content based on the candidate user; and
    displaying an actionable user interface including the at least one key moment.

2. The method of claim 1, wherein the determining of the plurality of key moments in the multimedia content based on the navigational behavior comprises:
    determining a navigation score for each of a timestamp from a plurality of timestamps of the multimedia content;
    determining, for each of the timestamp of the multimedia content, whether the navigation score is above a navigation threshold, below a navigation threshold or equal to the navigation threshold; and
    determining the key moment among the plurality of key moments as:
        the positive key moment based on the navigation score of at least one timestamp from the plurality of timestamps being above the navigation threshold,
        the negative key moment based on the navigation score of at least one timestamp from the plurality of timestamps being below the navigation threshold, and
        the neutral key moment based on the navigation score of the at least one timestamp from the plurality of timestamps being equal to the navigation threshold.

3. The method of claim 2, wherein the determining of the navigation score for each of the timestamp from the plurality of timestamps of the multimedia content comprises:
    detecting an event associated with the multimedia content based on a number of times at least one portion of the multimedia content is played back;
    assigning a weight to each of the timestamps of the multimedia content based on the event; and
    determining the navigation score for each of the timestamp based on the assigned weight.

4. The method of claim 2,
wherein a start point and an end point of the positive key moment is identified based on the navigation score of the at least one time stamp being above the navigation threshold,
wherein a start point and an end point of the negative key moment are identified based on the navigation score of the at least one time stamp being below the navigation threshold, and
wherein a start point and an end point of the neutral key moment are identified based on the navigation score of the at least one time stamp being equal to the navigation threshold.

5. The method of claim 1, wherein the determining of the navigation behavior of each user of the multimedia content comprises:
creating a user profile of each of the user based on a plurality of parameters associated with the user;
detecting interactions of each of the users on at least one timestamp of the multimedia content during playback; and
determining a navigation behavior of each of the users of the multimedia content based on the interactions of each of the users on at least one timestamp.

6. The method of claim 1, further comprising:
automatically performing at least one action corresponding to at least one of the key moments.

7. The method of claim 6, wherein the retrieving of the at least one key moment from the plurality of key moments in the multimedia content based on the candidate user comprises:
determining at least one user profile matching for the candidate user; and
retrieving the at least one key moment from the plurality of key moments in the multimedia content based on the navigational behavior of the at least one matching user profile.

8. The method of claim 6, wherein the actionable user interface comprising the at least one key moment is displayed on at least one of a timeline of the multimedia content, at least one portion of a screen of the electronic device, or at least one portion of the multimedia content.

9. The method of claim 6, wherein the positive key moment, the negative key moment or the neutral key moment is differenced in the actionable user interface by using a unique identifier.

10. The method of claim 6, wherein the at least one action comprises at least one of:
fast forwarding the at least one key moment in the multimedia content;
focusing on the at least one key moment in the multimedia content;
controlling a playback speed of the at least one key moment in the multimedia content;
extracting an audio from the at least one key moment, sharing only the at least one key moment from the multimedia content;
previewing only the at least one key moment from the multimedia content; or
downloading only the at least one key moment from the multimedia content.

11. An electronic device for automatically providing key moments in a multimedia content, the electronic device comprising:
a memory; and
at least one processor coupled to the memory,
wherein the at least one processor is configured to:
determine a navigation behavior of each user of the multimedia content during playback,
determine a plurality of key moments in the multimedia content based on the navigational behavior, the plurality of key moments including a positive key moment, a negative key moment, and a neutral key moment,
store the plurality of key moments,
detect a playback event of the multimedia content by a candidate user,
retrieve at least one key moment from the plurality of key moments in the multimedia content based on the candidate user, and
display, on a display, an actionable user interface comprising the at least one key moment.

12. The electronic device of claim 11, wherein the at least one processor is further configured to:
determine a navigation score for each of a timestamp from a plurality of timestamps of the multimedia content;
determine, for each of the timestamp of the multimedia content, whether the navigation score is above a navigation threshold, below a navigation threshold or equal to the navigation threshold; and
determine the key moment of the plurality of key moments as:
the positive key moment based on the navigation score of at least one timestamp from the plurality of timestamps being above the navigation threshold,
the negative key moment based on the navigation score of at least one timestamp from the plurality of timestamps being below the navigation threshold, and
the neutral key moment based on the navigation score of the at least one timestamp from the plurality of timestamps being equal to the navigation threshold.

13. The electronic device of claim 12, wherein the at least one processor is further configured to:
detect an event associated with the multimedia content based on a number of times at least one portion of the multimedia content is played back;
assign a weight to each of the timestamps of the multimedia content based on the event; and
determine the navigation score for each of the timestamp based on the assigned weight.

14. The electronic device of claim 12, wherein a start point and an end point of the positive key moment are identified based on:
the navigation score of the at least one time stamp being above the navigation threshold,
the navigation score of the at least one time stamp being below the navigation threshold, and
the navigation score of the at least one time stamp being equal to the navigation threshold.

15. The electronic device of claim 11, wherein the at least one processor is further configured to:
create a user profile of each of the user based on a plurality of parameters associated with the user;
detect interactions of each of the users on at least one timestamp of the multimedia content during playback; and
determine a navigation behavior of each of the users of the multimedia content based on the interactions of each of the users on at least one timestamp.

16. The electronic device of claim 11, the at least one processor is further configured to:
automatically perform at least one action corresponding to at least one of the key moments.

17. The electronic device of claim 16, wherein the at least one processor is further configured to:
determine at least one user profile matching for the candidate user; and
retrieve the at least one key moment from the plurality of key moments in the multimedia content based on the navigational behavior of the at least one matching user profile.

18. The electronic device of claim 16, wherein the actionable user interface comprising the at least one key moment is displayed on at least one of a timeline of the multimedia content, at least one portion of a screen of the electronic device, or at least one portion of the multimedia content.

19. The electronic device of claim 16, wherein the positive key moment, the negative key moment or the neutral key moment is differenced in the actionable user interface by using a unique identifier.

20. The electronic device of claim 11,
wherein the at least one processor is further configured to:
determine that multiple users are interacting with the multimedia content; and
extract matching user profiles based on user information,
wherein the user information is extracted from at least one of a data store, a face recognition engine or a user recognition engine, and
wherein the at least one processor is further configured to determine an intersection of the matching user profiles to find a common area of interest among the multiple users.

* * * * *